United States Patent
Rakib

(10) Patent No.: US 8,151,306 B2
(45) Date of Patent: Apr. 3, 2012

(54) REMOTE CONTROL FOR WIRELESS CONTROL OF SYSTEM INCLUDING HOME GATEWAY AND HEADEND, EITHER OR BOTH OF WHICH HAVE DIGITAL VIDEO RECORDING FUNCTIONALITY

(75) Inventor: Selim Shlomo Rakib, Cupertino, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 4613 days.

(21) Appl. No.: 09/898,728

(22) Filed: Jul. 3, 2001

(65) Prior Publication Data

US 2002/0031120 A1 Mar. 14, 2002

Related U.S. Application Data

(63) Continuation-in-part of application No. 09/602,512, filed on Jun. 23, 2000, now Pat. No. 6,857,132, which is a continuation-in-part of application No. 09/483,681, filed on Jan. 14, 2000, now abandoned.

(51) Int. Cl.
*H04N 7/20* (2006.01)
*H04N 5/445* (2011.01)

(52) U.S. Cl. ............................................ 725/71; 725/43

(58) Field of Classification Search .................... 725/71, 725/43
See application file for complete search history.

(56) References Cited

U.S. PATENT DOCUMENTS

| | | | |
|---|---|---|---|
| 5,659,351 A | 8/1997 | Huber | 348/7 |
| 6,188,397 B1 | 2/2001 | Humpleman | 345/327 |
| 6,188,871 B1 | 2/2001 | Kitamura et al. | 455/6.1 |
| 6,408,436 B1 | 6/2002 | De Haas | 725/86 |
| 6,437,836 B1 * | 8/2002 | Huang et al. | 348/734 |
| 6,453,473 B1 | 9/2002 | Watson, Jr. | 725/120 |
| 7,143,429 B2 * | 11/2006 | Mineyama | 725/58 |
| 2001/0018772 A1 | 8/2001 | Shibata et al. | 725/93 |
| 2002/0059637 A1 | 5/2002 | Rakib | 725/119 |
| 2005/0028208 A1 * | 2/2005 | Ellis et al. | 725/58 |

* cited by examiner

*Primary Examiner* — Pankaj Kumar
*Assistant Examiner* — Franklin Andramuno

(57) ABSTRACT

A system for wireless remote control of a gateway and ordering or invocation of services provided by a headend. The remote control includes a video display and user input device or keyboard and can decompress and display compressed streaming video in some embodiments. Some species of the remote control can act as web browsers, appliance control, TIVO function control, an IP telephony telephone, a cellular telephone and/or an MP3 player. In some embodiments, the gateway and/or headend can implement TIVO-like functions under control from a wireless remote of custom design or implemented on a Personal Digital Assistant.

7 Claims, 9 Drawing Sheets

Advanced Home Gateway

REMOTE CONTROL FOR WIRELESS CONTROL OF SYSTEM INCLUDING HOME GATEWAY AND HEADEND, EITHER OR BOTH OF WHICH HAVE DIGITAL VIDEO RECORDING FUNCTIONALITY

This is a continuation-in-part of United States Patent application entitled HEAD END MULTIPLEXER TO SELECT AND TRANSMIT VIDEO-ON-DEMAND AND OTHER REQUESTED PROGRAMS AND SERVICES, filed Jun. 23, 2000, Ser. No. 09/602,512 now U.S. Pat. No. 6,857,132 which was a continuation-in-part of a U.S. patent application entitled HOME NETWORK FOR ORDERING AND DELIVERY OF VIDEO ON DEMAND, TELEPHONE AND OTHER DIGITAL SERVICES, filed Jan. 14, 2000, Ser. No. 09/483,681, now abandoned both of which are hereby incorporated by reference. This application discloses gateways and settop decoders for use in home networks as well as the home network itself and an intelligent remote control.

BACKGROUND OF THE INVENTION

The introduction of cable modems and broadband services to cable television systems has given rise to the development of home gateway systems. These systems couple the digital and analog cable television hybrid fiber coax cables to telephones, computers, FAX machines, settop box TV adapters, digital VCRs, cameras etc. for bidirectional digital communication with the headend and receiving conventional analog downstream broadcasts. These systems can implement video on demand, broadband internet access, monitoring at the headed of security camera video taken in customer homes, interactive games resident on a server at the headend and a host of other applications.

Personal digital assistants and handheld computers (hereafter PDAs) that can display video exist. However, to the applicant's knowledge, no PDA has the application software and communication circuitry and drivers needed to communicate with a gateway and act as a remote control to control analog and digital equipment at a customer premises. Further, no PDA exists which can act as a remote control to control headend processing relevant to the customer premises where the remote is located such as ordering video-on-demand selections, responding to queries, sending and receiving e-mail through a mail server at the headend, browsing the internet by sending URL and other commands to a web server at the headend and displaying the retrieved web pages, interacting with game servers at the headend, etc.

Further, no remote control that is not a modified PDA exists with a display that can display television or other images. In particular, no remote control, whether based on a PDA or not, exists that can by issuing commands through a cable modem and gateway at a customer premises, monitor one video channel while watching another.

With the advent of digital broadcast television systems such as DirecTV and Dish Network and cable TV and ADSL systems delivering digital data, a need for gateway circuits that can interface these different mediums to various peripherals that use the data has arisen. The UltimateTV personal digital data "pseudo video tape recorder" is one limited type of gateway that has recently become commercially available to interface a satellite dish and a telephone line to a wireless remote control and a television. The applicants do not admit the UltimateTV gateway is prior art since the applicant's invention of the same concept dates back at least to the summer of 2000. The UltimateTV gateway however does not have the ability to also interface an HFC or DSL network to peripherals either directly connected to the gateway through USB or Firewire or SCSI buses or indirectly connected through one or more local area networks.

The introduction of the TIVO personal digital video recorder has created a whole new market. However the TIVO has several disadvantages. The TIVO uses infrared commands to an infrared transducer affixed to an external digital video broadcast receiver to change the channels thereof in response to channel selection commands entered by a TIVO remote control. The satellite receiver is external to the TIVO system, and has its own remote control. The TIVO prior art system gets confused and often records no signal at all when an uninitiated family member such as a child changes the channel on the separate digital TV satellite receiver using that receiver's remote control instead of the TIVO controller. This confuses the TIVO prior art system because, if the channel is changed without using the TIVO controller, the TIVO system does not know to which channel the dish receiver is currently tuned. Strangely, the TIVO prior art system tunes an external digital video satellite receiver by sending it infrared "differential" commands. Thus, if the TIVO knows the receiver is tuned to channel 100 and the TIVO wants to record a program on channel 125, the TIVO will issue a command to increase the channel number by 25 either by giving 25 channel up commands or by giving a command to increase the channel number by 25 instead of simply giving a command "change to channel 125". This is a serious drawback if small children or TIVO-challenged people are using the TV. Further, because the satellite receiver is external to the TIVO, it must be kept on at all times because the TIVO cannot turn it on and off when needed to record programs. In energy starved states like California, this is a problem.

Recently, the UltimateTV personal digital video recorder was introduced by Microsoft that solves the "on all the time" and channel confusion problems of TIVO. This unit may not be prior art to the gateway and headend cherrypicker that implement TIVO functions inventions disclosed herein because of an earlier conception date. Further, having the TIVO functions done in a gateway or a headend is different than having then done in a separate digital video recorder, and it saves customers money by only needing to pay for the service and not buy an entire TIVO unit and subscription to the program data.

A need has therefore arisen for a wireless remote control which can, through a cable modem and gateway and settop box, issue commands to a headend to allow the remote to monitor one video channel while watching another on a TV. There is also a need for an intelligent remote that can change video channel selections for the TV or remote by issuing commands to the headend. There is also a need for an intelligent remote control that can issue commands to a headend to order video-on-demand programs. There is also a need for a wireless remote that can issue commands to a headend to browse the internet through a headend web server and display text and graphics or web pages or e-mail on the remote display or on a television coupled to a gateway in communication with the remote. There is also a need for an intelligent remote that can issue commands to a gateway or headend to control the gateway or headend to carry out TIVO-like functions for the customer. There is also a need for a gateway that can implement TIVO like functions as well as interface peripherals to various types of broadband digital data delivery transmission mediums and headend circuitry providing digital data delivery services. There is also a need for a headend cherrypicker that can be controlled by a wireless remote control which can implement TIVO like recording functions.

SUMMARY OF THE INVENTION

The genus of the invention is defined by a group of species comprised of systems that can work with an intelligent remote control to control services provided to a customer through headend servers and other equipment in a bidirectional digital data delivery system implemented over some transmission medium. In this class of systems, the transmission medium may be a CATV HFC network or any other bidirectional digital data communication medium between a gateway at the customer premises and a headend. Other mediums the systems of the invention may be built around are DSL lines or bidirectional digital satellite services.

A subgenus within the genus of the invention is a class of intelligent remote controls with a display which can issue commands to the headend in a bidirectional digital data communication system to do one or more of the following functions:
(1) monitor one video channel while watching another on a TV;
(2) change video channel selections for the TV or remote;
(3) order video-on-demand programs;
(4) browse the internet through a headend web server and display text and graphics of web pages or e-mail on the remote display;
(5) control local peripherals coupled to a customer premises gateway either directly by RF or infrared link to the peripheral or through commands issued to the gateway from the remote via a settop box with suitable RF or infrared transceiver circuitry;
(6) carry out TIVO-like functions for the customer; and/or
(7) and control any other servers or other circuitry at the headend to enjoy services provided to the customer from the headend.

In addition, in some embodiments within the intelligent remote control genus, a PDA serves as the platform on which the intelligent remote control application runs and additional software applications can be added to the PDA for calendar, contacts or phone book, etc. In addition, the PDA may have a PCMCIA port into which PC cards to provide expansion memory and/or other expansion functions such as wireless modems for wireless e-mail and investing functions, cellular phone calls, etc.

Figure 2:
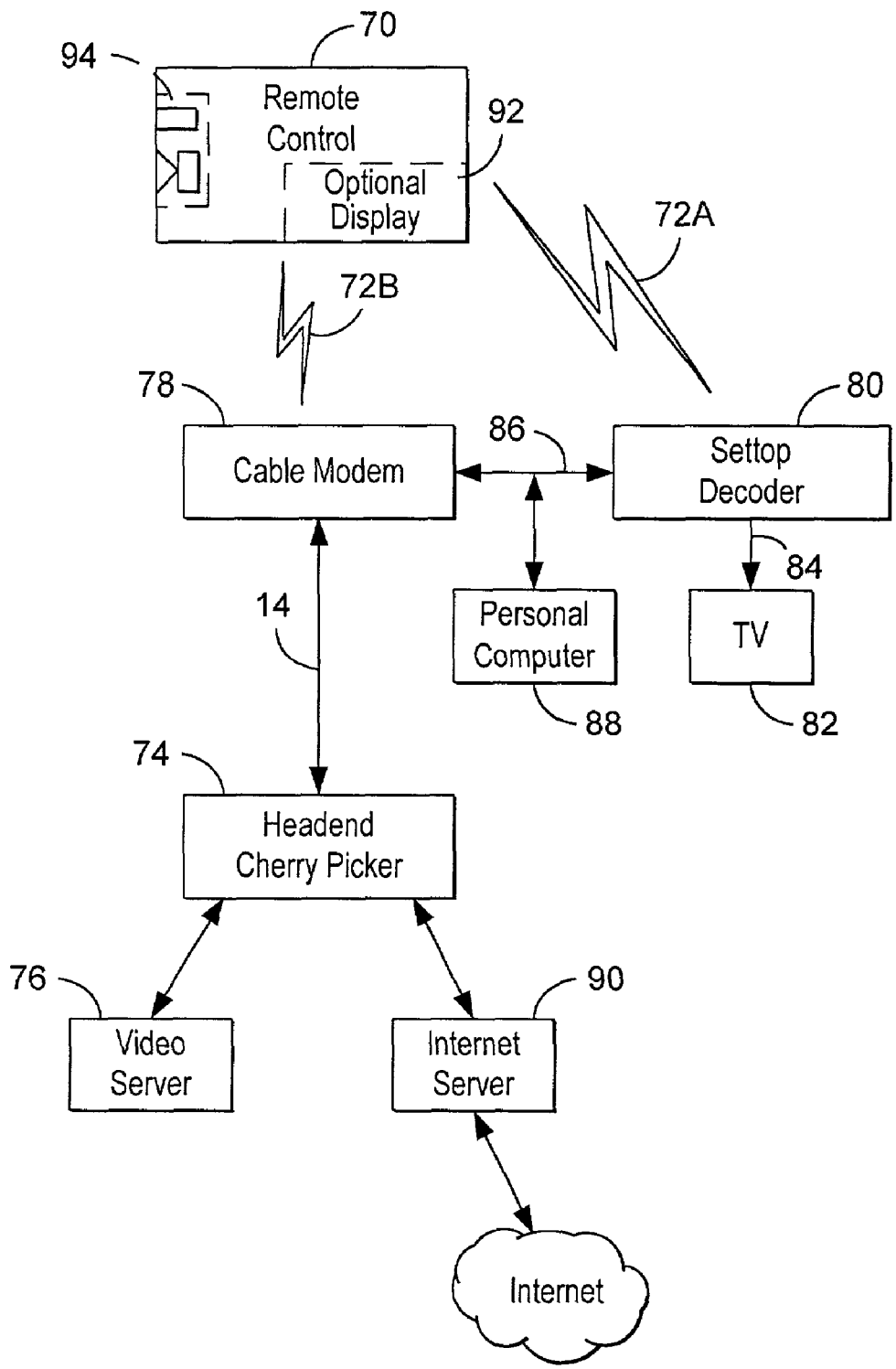

The broadest concept of the invention is illustrated in FIG. 2 which teaches a remote control without a display that can issue wireless commands to a headend to invoke services provided thereby through one or more servers that provide the requested service.

Figure 3:
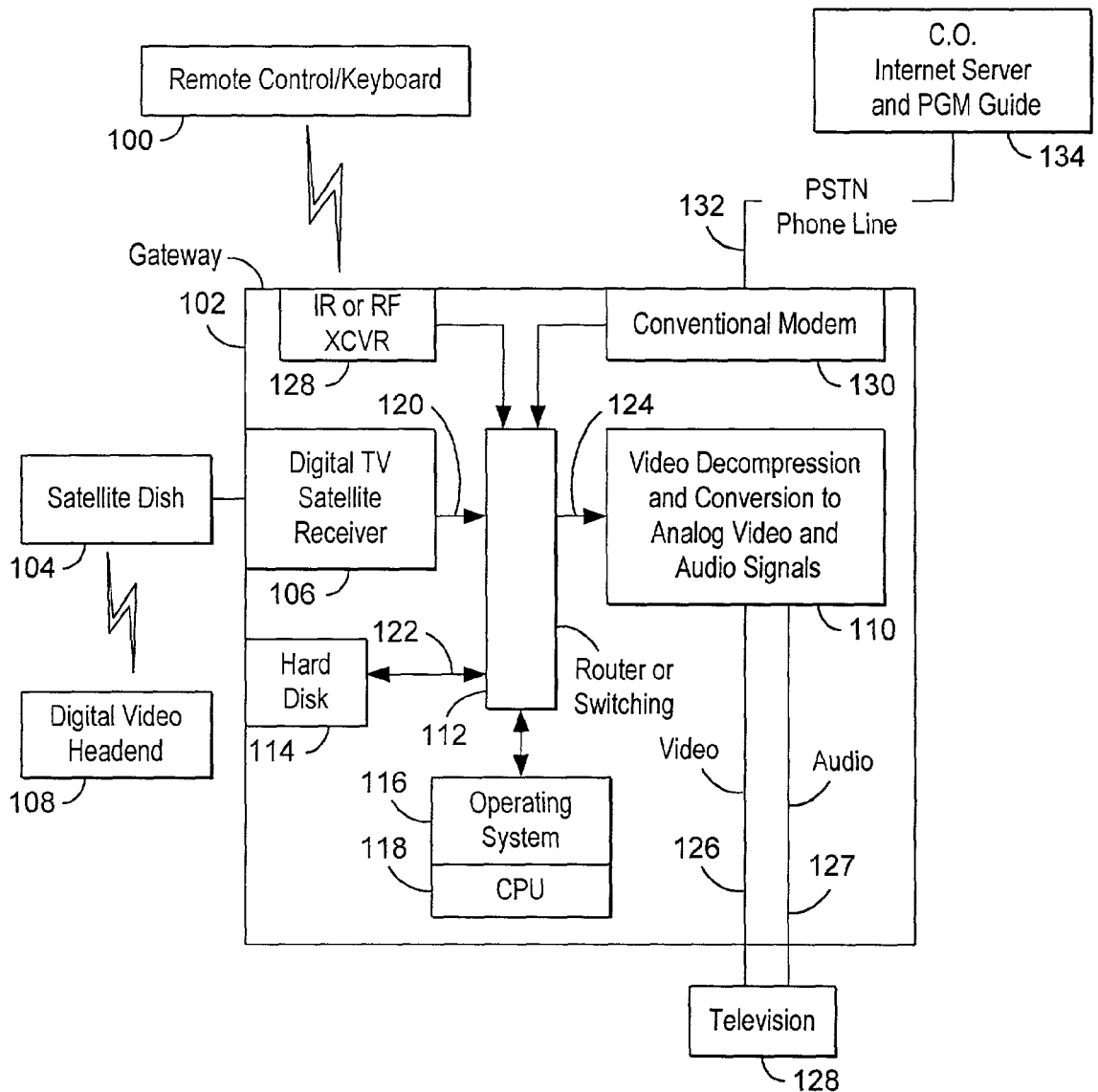

FIG. 3 discloses limited use customer premises system utilizing a wireless remote control that controls a specialized TIVO-like gateway that interfaces a television to a satellite dish to receive digitized video broadcasts or video-on-demand data from a digital video headend elsewhere and interfaces the television and wireless keyboard remote to the public service telephone network for bidirectional IP packet data transfers to and from the internet via an internet server at the central office.

Figure 4:
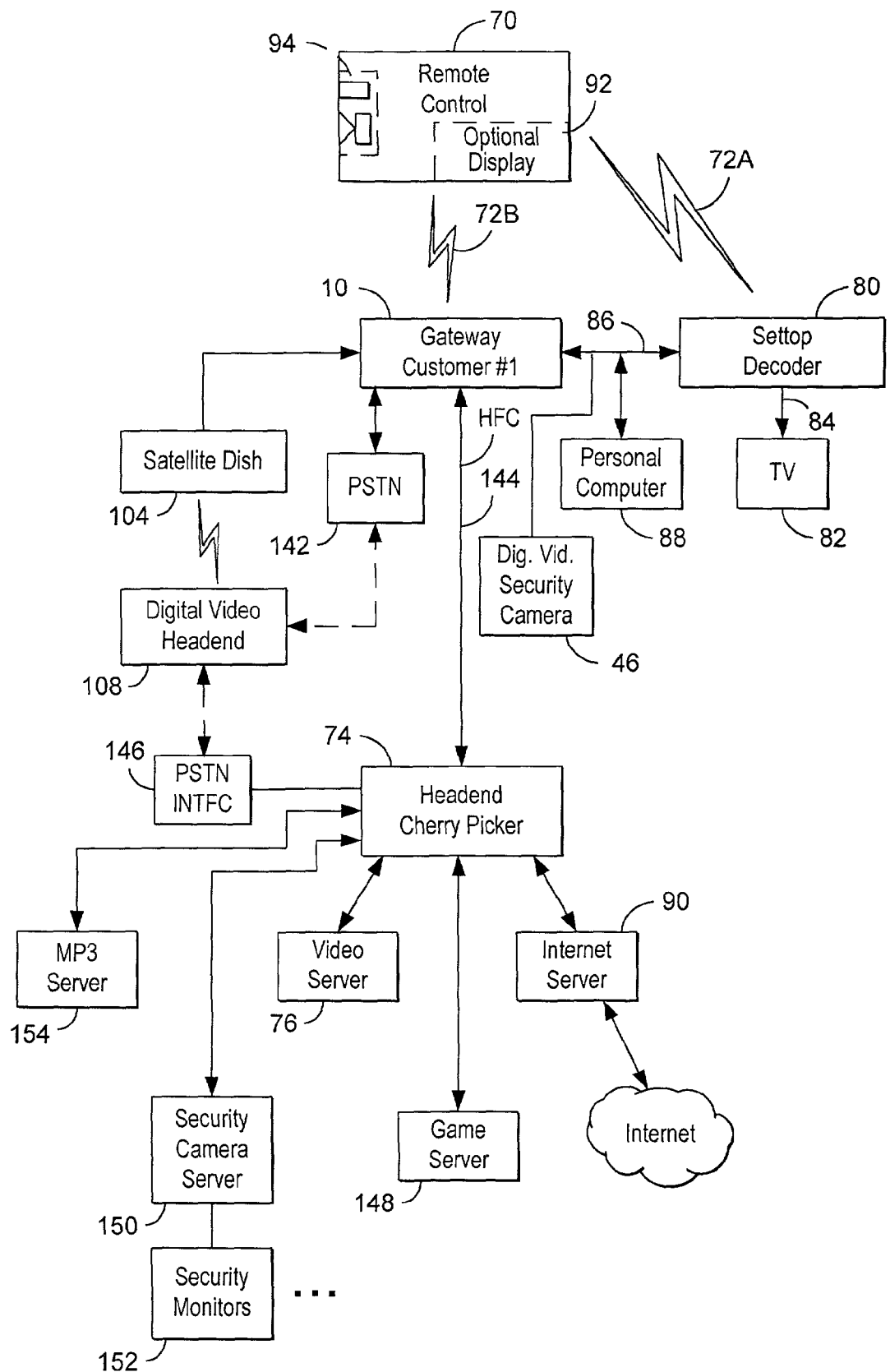

FIG. 4 is a block diagram of a system that uses a satellite link for unidirectional downstream digital video transmissions and uses a gateway coupled to a hybrid fiber coaxial network of a cable television system for provision of bidirectional high speed internet access and other broadband services.

Figure 1:
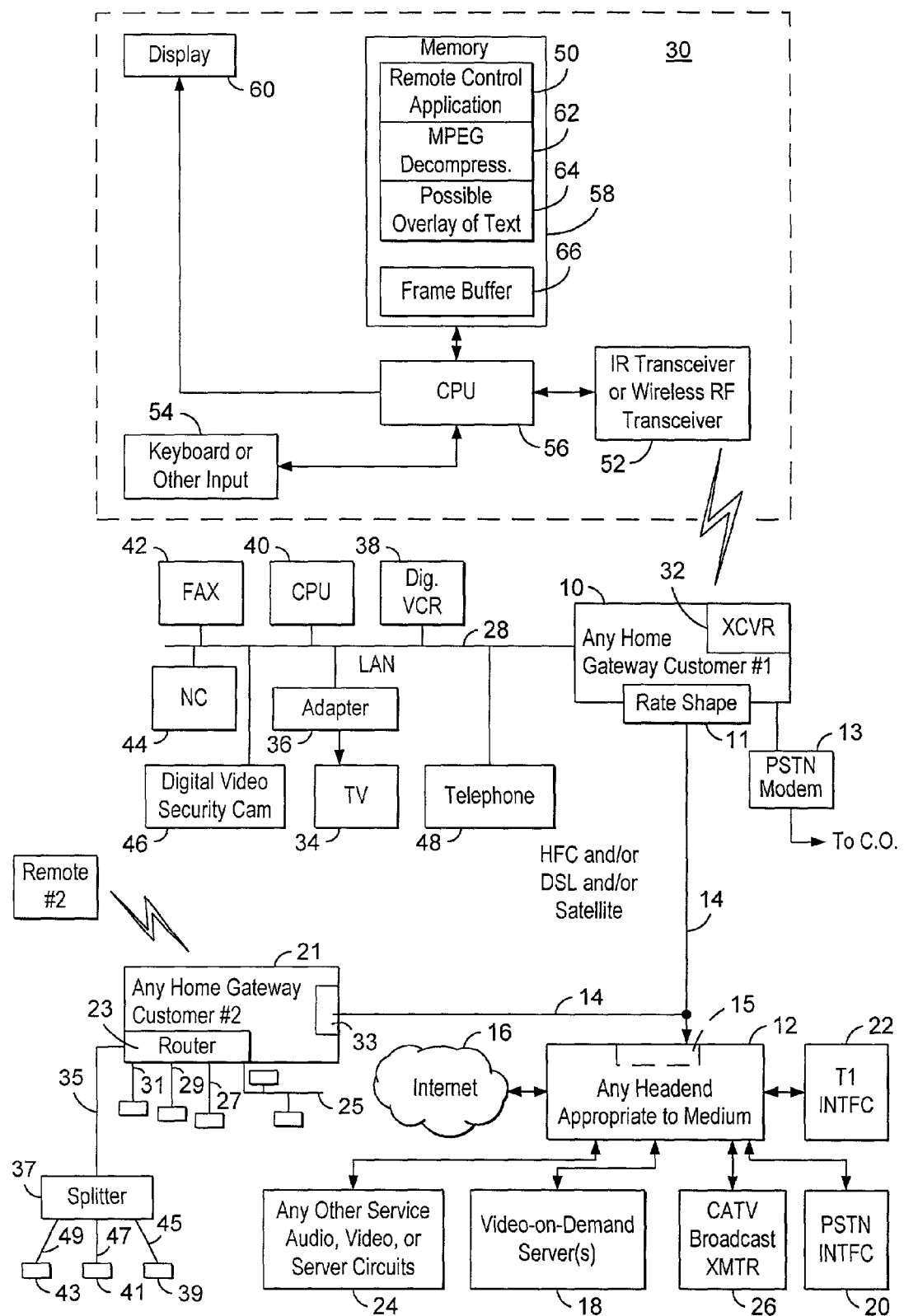
FIG. 1 is a block diagram of generic species of system using an intelligent remote control that can exercise and control services provided by headend equipment to a customer premises in which the remote is used.
Figure 5:
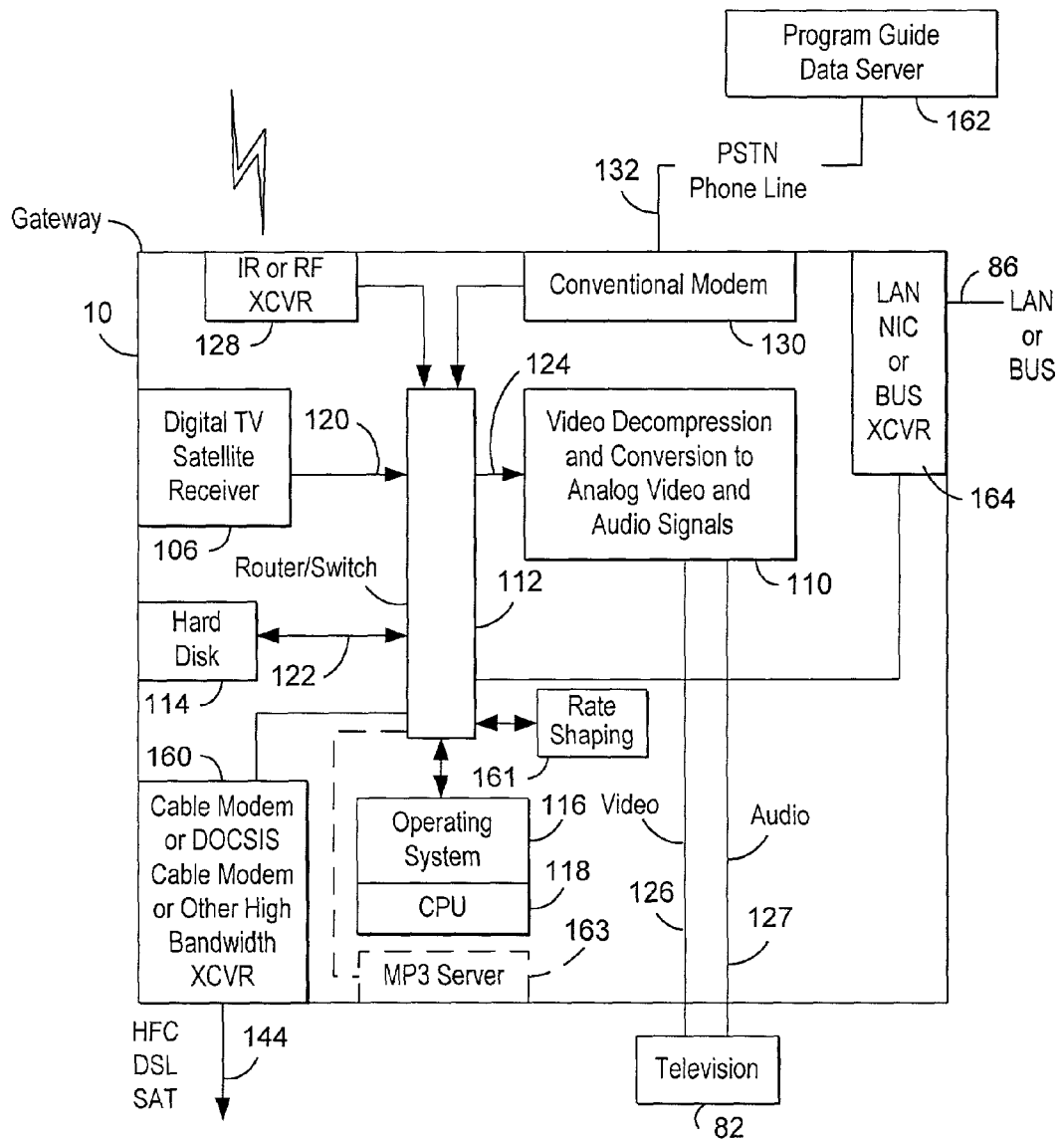

FIG. 5 is a block diagram of one embodiment for a gateway 10 in FIGS. 1 and 4 which have the ability to implement TIVO functions as well as interface the peripherals coupled to the gateway to two different broadband digital data delivery systems, specifically, digital video data broadcast systems and high bandwidth digital data services delivered over and HFC cable plant.

Figure 6:
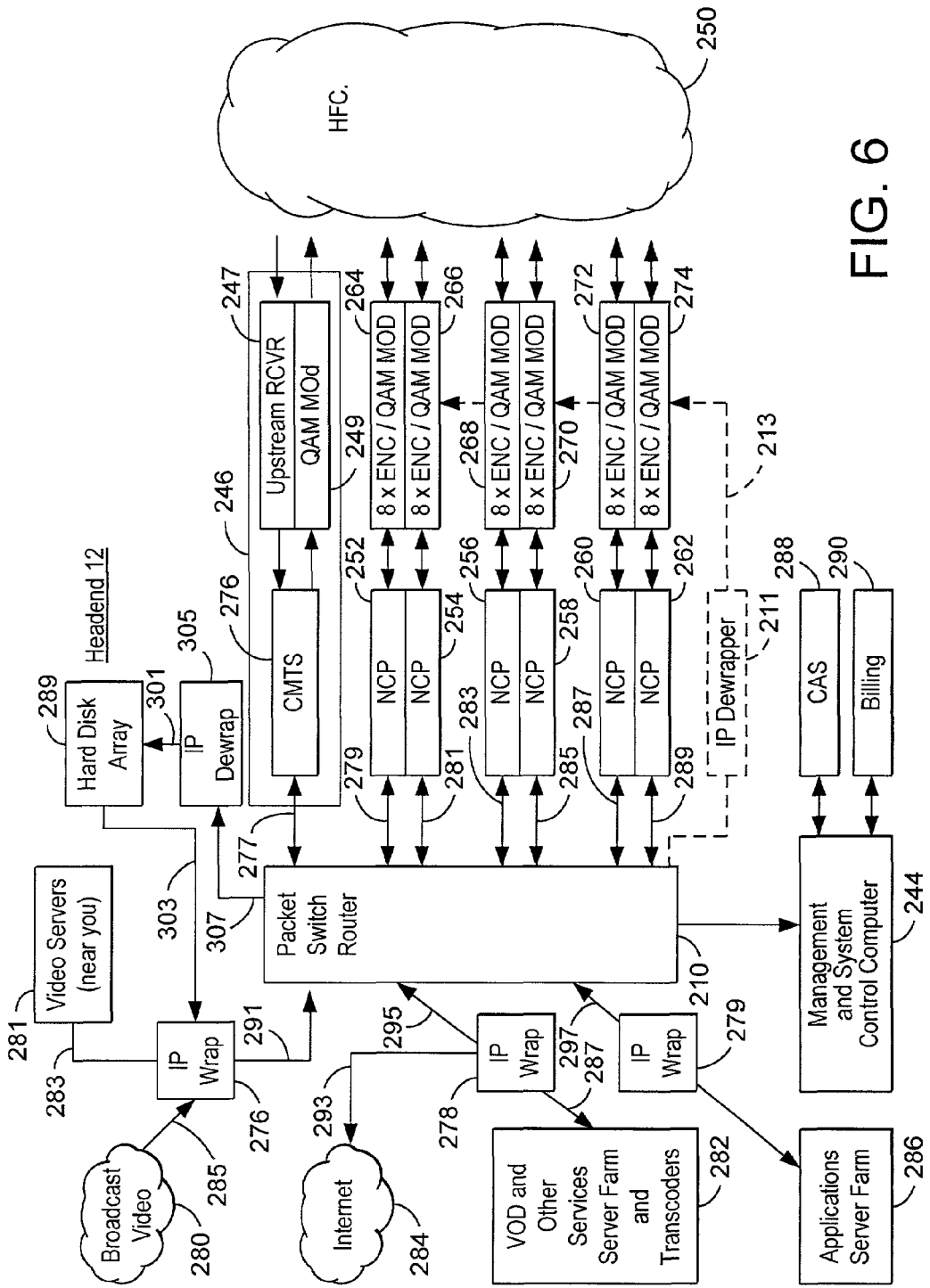

FIG. 6 is a block diagram of a more generalized architecuture for a cable headend, central office or satellite uplink facility to deliver iData and VOD and/or broadcast video data to customers via HFC, DSL or satellite and which can perform TIVO functions for each customer using disk storage at the headend.

Figure 7:
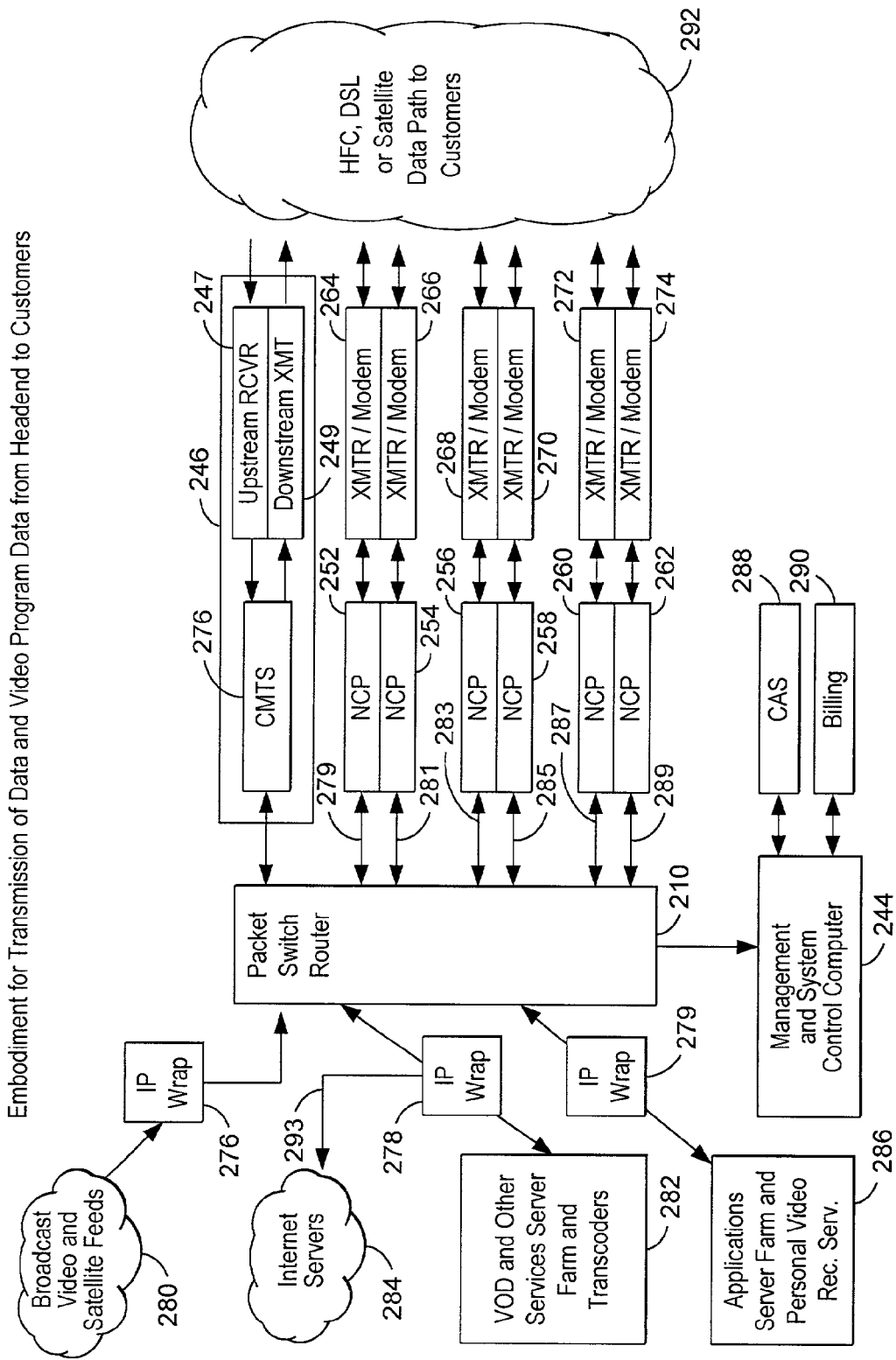

FIG. 7 is a block diagram of a more generalized architecuture for a cable headend, central office or satellite uplink facility, represented by cloud 292.

Figure 8:
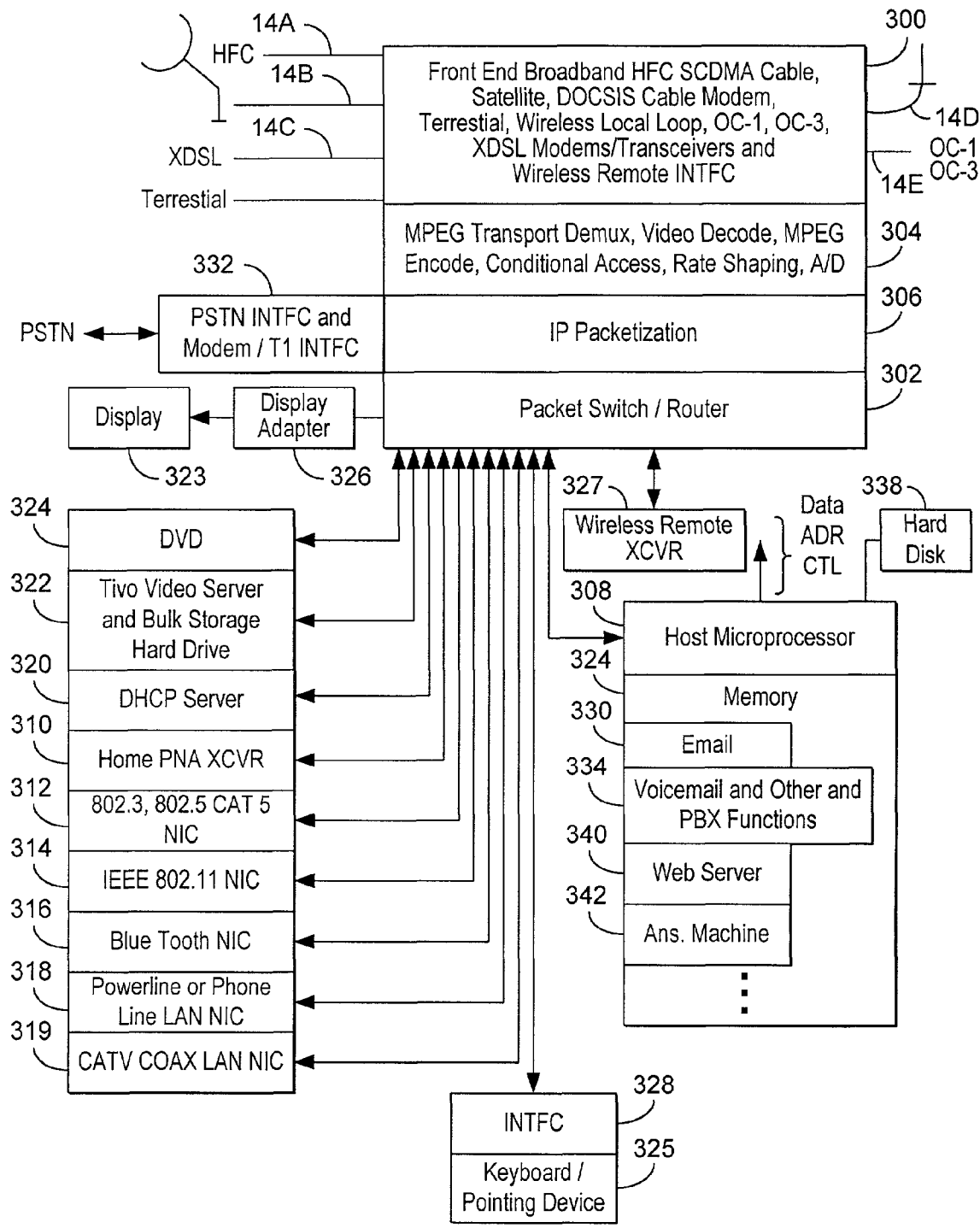

FIG. 8 is a block diagram of an advanced home gateway with built in TIVO video server, multiple broadband interface capability, multiple LAN interface capability and built in email, web server, answering machine, voicemail and PBX functionality.

Figure 9:
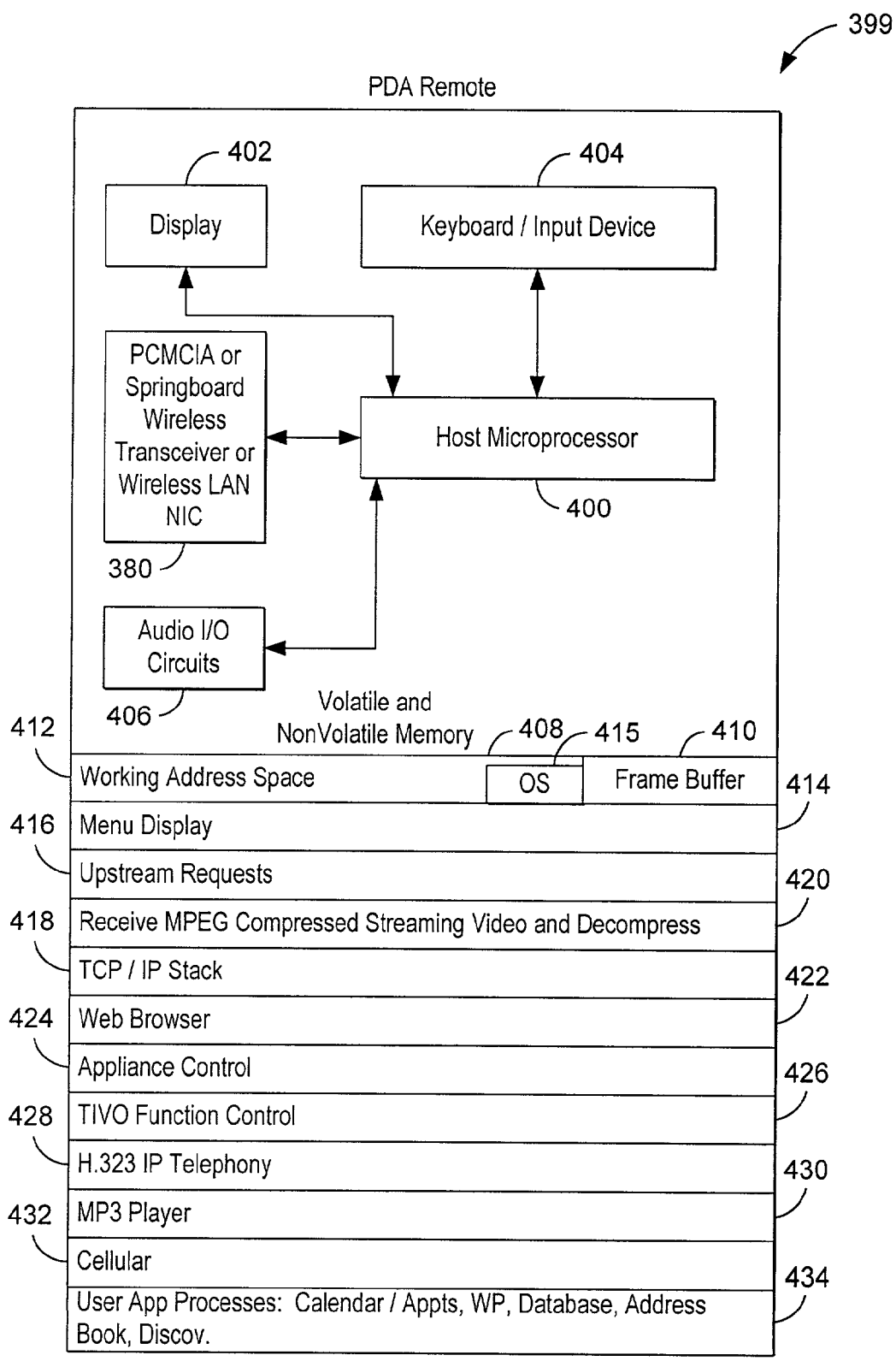

FIG. 9 is a block diagram of a wireless remote control implemented on a personal digital assistant (PDA) having wireless capabilities. The remote control of FIG. 9 can do all regular PDA functions it is programmed to do such as calendar and appointments, word processing, database and address book functions. However, in addition, it has a wireless RF transceiver module 380 that plugs into the PDA's PCMCIA or Handspring Visor Springboard slot by which commands and data can be exchanged with the transceiver of a home gateway or some settop decoder with a transceiver on a LAN coupled to the gateway.

DETAILED DESCRIPTION OF THE PREFERRED AND ALTERNATIVE EMBODIMENTS

FIG. 1 is a block diagram of generic species of system using an intelligent remote control that can exercise and control services provided by headend equipment to a customer premises in which the remote is used. The invention contemplates a genus of systems all species of which share the following common characteristics: all species include a remote control with display which is capable of sending commands to the headend through a gateway at the customer premises to exercise and control customer services provided by a headend. Such systems include the following components.

First, there must be an individual, wireless remote control 30.

Second, there must be a suitable home gateway 10 that includes a router with multiple ports for coupling to multiple LANs or directly to multiple peripherals or via multiple individual LAN segments, each coupled to a peripheral. The gateway must be one which can interface to the remote control, the one or more local area networks coupled to the peripherals to be serviced from the headend and one or more of the types of high bandwidth transmission medium 14. The broadband transmission medium 14 can be satellite, hybrid fiber coaxial cable, XDSL or wireless local loop or some combination of these different types of mediums. The gateway must be able to do the appropriate routing and any needed protocol conversions to get the data transmitted over whatever data path the router sets up.

There will also be one or more local area networks 28 and/or individual LAN segments acting as dedicated lines from gateway 10 to each peripheral. The LAN(s) or individual LAN segments/dedicated lines couple the gateway's router to peripherals that exercise or utilize the customer services provided by the headend. Typically, there is one fast LAN and one slower LAN, but any type of physical medium in any configuration and any protocol including wireless LAN technology and LANs that use the power lines, phone lines, existing CATV coax, or custom installed wires may be used. Each port of the router can be coupled to a LAN which can be expanded by addition of repeaters, bridges or switches. The choice of LAN technology should be made based upon the anticipated traffic load since streaming video is a high bandwidth proposition even when compressed. The LAN configuration should also be established so that the various peripherals coupled to the router in the gateway can talk to each other over the LAN or LANs or individual LAN segments or dedicated lines. Gateway 21 at customer premises #2 illustrates a gateway with a router 23 with multiple ports coupled to a first LAN configuration 25 and individual LAN segments 27, 29 and 31 coupled to peripherals. Gateway 21 also has a third LAN implemented on the existing CATV coaxial cable wiring in the home. Coax segment 35 couples the router 23 to a splitter 37. The splitter is coupled to a plurality of peripherals 39, 41, 43 via individual coaxial cable segments 45, 47 and 49. The individual peripherals can talk to each other through the router 23 or via the leakage path between splitter ports. This use of existing CATV wiring as a LAN is covered in the claims one incarnation of the limitation "local are network". In some embodiments using existing CATV wiring as the LAN, frequency division multiplexing is used wherein existing analog CATV broadcasts are transmitted on the coax in one frequency band and digital data is communicated over the coaxial cable acting as a LAN on one or more RF carriers in a different band that does not interfere with the CATV analog signal carriers. Gateway 21 also has a rate shaping circuit 33.

There will also be one or more suitable type headend(s) 12 that can interface to the one or more broadband transmission medium(s) 14 in use and which includes or is coupled to one or more servers or other circuits which provide the customer services to the peripherals. The headend(s) are controlled by the remote controls at the customer premises.

Signals to be transmitted over shared hybrid fiber coaxial cable networks or local area networks at the customer premises to decoding circuits or other destination circuits may consume more bandwidth than is available. This is because the total available bandwidth on HFC is shared between all customers on the same network, so in times of high demand, not every customer gets all the bandwidth needed. However, video is a very high bandwidth application, so conflicts between bandwidth needed and bandwidth available can arise in HFC. Likewise, bandwidth on DSL lines is limited also, but it is not limited from sharing. It is limited from the limitations of twisted pair transmission mediums. Likewise, satellite uplinks and downlinks are shared among large numbers of customers, so bandwidth availability is an issue. There exists in the prior art bandwidth modification circuitry which can alter the consumed bandwidth so as to fit the available bandwidth of the channel or medium on which data is to be transmitted. Bandwidth alteration processing can be accomplished in commercially available integrated circuits designed by Imedia and available from the assignee of the present invention.

To help avoid bottlenecks and congestion on transmission medium 14, headend 12 may include optional rate shaping circuitry, symbolized by dashed box 15, to adjust the data rate of data transmitted to the gateways 10 or received from the gateways to help alleviate bottlenecks on transmission medium 14. In some embodiments, all of the gateways and cherrypickers disclosed in the various embodiments disclosed herein include, where necessary, rate shaping circuitry or bandwidth modifiers to programmably alter the data rate and bandwidth consumed by various data transmissions. In other embodiments, there will be rate shaping circuitry only in the gateways or only in the headend. In other embodiments where the bandwidth of transmission medium 14 is large such as in fiber-to-the-curb systems, rate shaping circuitry may possibly be omitted altogether. The rate shaping circuitry is managed to give the best quality of video for the available bandwidth. All the gateways and cherrypickers disclosed herein also, where necessary, include circuitry to manage overflow or underflow of buffers in the circuits to which data is being transmitted over the LAN or hybrid fiber coaxial cable network.

Gateway 10, in some embodiments, incorporates a hard disk to record digital video data or other data received via the medium or mediums 14 by which the gateway is coupled to one or more headend servers. Further, gateway 10, in some embodiments, contains suitable interface circuitry to interface to more than one type of transmission medium coupling it to headend servers. For example, medium 14 may include a satellite dish and/or an HFC network and/or a DSL line and/or a conventional terrestial television antenna. Therefore, in various embodiments, gateway 10 may include: circuitry that implements the functions of a digital broadcast television receiver such as a DirecTV or Dish network receiver; a cable modem or DOCSIS cable modem; and/or a DSL modem; a LAN interface, a personal video recording hard disk and control circuitry to implement TIVO functions and rate shaping circuitry 11 to change the data rate of data transmitted to or received from headend 12 over transmission medium 14. Rate shaping circuitry 11 also functions to rate shape (alter the data rate and bandwidth consumed) video data received from the headend 12 or from the hard disk of a TIVO system embedded in gateway 10 to alter the data rate to match the transmission capabilities of LAN 28. The structure and operation of rate shaping circuitry is well known and chips to do it have been designed by Imedia, Inc., formerly of San Francisco, Calif., and are now in public use by the assignee of the present invention. Rate shaping circuitry, circuitry to transmit variable bit rate compressed video data and auxiliary data at a constant bit rate, circuitry to minimize data rate fluctuations in forming multiplexes of multiple MPEG video streams, circuitry to provide video-on-demand to multiple subscribers simultaneously, circuitry to multiplex multiple MPEG encoded video channels onto one data channel more efficiently, circuitry to playback compressed video is described in U.S. Pat. Nos. 5,956,088 and 5,877,812 and 5,966,120 and 5,926,205 and 5,949,948 and 5,862,140, all of which are hereby incorporated by reference. This circuitry may be employed in the gateway and/or headend circuitry as necessary depending upon the choices for the LAN technologies at the customer premises and/or the high bandwidth transmission medium(s) 14.

Likewise, gateway 10 can include a conventional modem, represented by block 13, to interface the gateway to the public service telephone network (hereafter PSTN) to do such functions as downloading program guide data to implement TIVO functions in gateway 10.

The particular embodiment of FIG. 1 implements the system invention and the remote control invention, but the particular home gateway can be any existing gateway. Home gateways that can be used as gateway 10 are disclosed in a U.S. patent application Ser. No. 09/483,681, filed Jan. 14, 2000, entitled HOME NETWORK FOR ORDERING AND DELIVERY OF VIDEO ON DEMAND, TELEPHONE AND OTHER DIGITAL SERVICES, which is hereby incorporated by reference. This patent application discloses conventional ADSL gateways, conventional HFC gateways and a unique gateway that interfaces a plurality of different types of computing devices and television type equipment to hybrid fiber coaxial (HFC) cable broadband services, satellite dishes or terrestial broadcast antennas.

Gateway 10 has an RF or infrared transceiver 32 therein to send and receive data to/from remote 30 in customer premises #1. The gateway 10 also has an internal router and tuner and demodulation and detector circuitry suitable for the type of digital data transmissions from the headend that are being received. When the remote 30 issues commands to request services from the headend, the resulting digital data transmitted by the headend 12 to gateway 10 arrives on a particular logical channel. A logical channel will be a particular frequency RF carrier and a particular multiplexed logical channel thereon such as a particular timeslot or one or more particular spreading codes. The data on this particular logical channel will be transmitted for use on a particular peripheral coupled to LAN 28. For example, the remote control 30 might be used to order a particular video-on-demand movie to be displayed on television 34. This command will be received by gateway 10 and transferred to headend 12. The headend sends a suitable command to the video-on-demand servers 18 requesting the data of the requested movie. The data is provided and is transmitted by the headend on a particular logical channel on transmission medium 14 to gateway 10. The data of the movies is compressed and may be encapsulated into ATM cells or sent via DOCSIS MPEG packets or using any other suitable transport protocol that can provide the bandwidth, reliability, packet sequencing, error correction and other class of service factors needed for video data transmission. A downstream message is then sent to the gateway 10 telling it upon which logical channel it will be receiving particular requested data.

Gateway 10 then tunes to that RF carrier, demodulates and detects the data on the designated logical channel on that carrier, packetizes the data into Ethernet or other LAN packets depending upon the LAN 28 protocol, and addresses the packets to the LAN and IP address of settop adapter circuit 36. The adapter 36 then receives the packets and buffers them in a buffer big enough to take out network latency, bandwidth limitations and jitter, decompresses the data and generates audio and video signals from the digital data for output to TV 34. Similar processing occurs for digital data requested by the other peripherals or the remote 30. Typical peripherals in a customer premises that the gateway couples to the headend circuitry that service them are: digital VCR 38, home computer 40, digital FAX 42, network computer 44, digital security video camera 46 and digital telephone or videophone 48.

In some embodiments, TV 34 and settop decoder 36 may have a private LAN to the gateway to get around bandwidth limitations and high traffic on LAN 28 that does not leave enough bandwidth for the video.

In some embodiments, gateway 12 has intelligent hub management software that monitors traffic conditions and does whatever management and rate shaping is necessary to most efficiently use the LAN resources 28 and broadband resources 14 that are available.

In some embodiments, the gateway 12 and settop decoder/adapter 36 can be combined into one unit that the TV 34 just plugs into. Likewise, the gateway may have individual output ports that each peripheral plugs into with signals formatted properly at each port for the type of peripheral that plugs into it. For example, instead of having digital telephone coupled to LAN 48, a standard telephone may be plugged into gateway 12 with the gateway including all the necessary circuitry to convert the signalling protocols and audio signal physical layer format of standard telephones to voice over IP or voice over DOCSIS service.

The system of FIG. 1 comprises any headend circuitry 12 which is appropriate to the type of transmission medium 14 in use and the type of servers and circuitry that provide the customer services. The transmission medium can be HFC, any type of digital suscriber loop lines (DSL) or standard PSTN telephone tip and ring lines or bidirectional satellite services such as Starband™ or the new version of DirecPC™ now in beta test or some combination of the two such as DirecTV™/DirecPC™ satellite service for the downstream and standard telephone line or DSL upstream. Some of these satellite services cannot send video on demand at this time or other high bandwidth services, but the system of the invention does not require video can be implement just broadband internet access or other broadband, digital, non video based services. Accordingly transmission medium 14 may be one or more data paths and may include different types of data paths such as CATV HFC for downstream transmissions and different upstream medium such as DSL or analog phone lines or satellite services for upstream transmissions. Preferably, both the upstream and downstream transmissions are carried out on the same medium using any form of multiplexing to separate upstream from downstream and any form of multiplexing to separate data to/from different customer locations.

With regard to satellite medium, bidirectional broadband digital services exist or are in beta test such as Starband and the successor to DirecPC, and unidirectiona video broadcast services such as Dish Network and DirecTV exist but no bidirectional video-on-demand services yet exist as far as the applicants are aware. Thus, if medium 14 is satellite, it may actually be two separate links and headend 12 may be two separate entities, one for bidirectional broadband digital traffic and one for unidirectional, downstream only digital video broadcasting.

The headend circuitry can be connected to or contain any of a number of different services or networks. For example, the headend cherrypicker 12 may be connected to one or more of the following: the internet 16 via a WAN server in the headend; one or more video on demand servers 18; a public service telephone network interface 20; a T1 line interface 22; or any other service 24 such as MP3 or game servers, security camera video monitoring circuitry, etc.; and analog cable television broadcast transmitters 26. Cherrypickers are well known and commercially available. Suitable circuitry for cherrypicker 12 is also disclosed in a U.S. patent application entitled HEAD END MULTIPLEXER TO SELECT AND TRANSMIT VIDEO-ON-DEMAND AND OTHER REQUESTED PROGRAMS AND SERVICES, Ser. No. 09/602,512, filed Jun. 23, 2000, and another U.S. patent application entitled HEADEND CHERRYPICKER MULTIPLEXER WITH SWITCHED FRONT END, Ser. No. 09/667,892, filed Sep. 22, 2000, both of which are assigned to the assignee of this application and both of which are hereby incorporated by reference. Further, each gateway disclosed herein may have an MP3 or other digital audio server built into the gateway itself or as an expansion module for the gateway.

The headend cherrypicker 12 functions to receive commands from the gateway to order video-on-demand selections, browse the internet, dial a phone number, set up a video call or conference call, player game inputs, requests to download MP3 selections, etc. The cherrypicker 12 then carries out the appropriate actions and interfaces appropriately to the server or circuitry necessary to carry out the command and sends the appropriate digital data or analog signal downstream on medium 14. In the case of the analog CATV television signals, all these signals are broadcast on medium 14 separated by frequency division multiplexing, and gateway 10 just tunes to the appropriate channel, digitizes and compresses the video and audio and outputs it on local area network 28. Settop box converters then decompress the digital data and convert it to composite video or NTSC or PAL or SECAM format analog video signals for use by a television set.

Of course, LAN 28 may be implemented on the existing CATV wiring in the home or business, or CAT 5 wiring or 10BaseT, 100BaseT, 10Base2, Gigabit Ethernet, ATM, token ring or other LAN wiring or via wireless RF or infrared LAN systems currently available such as AirPort, etc. If existing CATV wiring is used as the network, the analog CATV signal tuned by the gateway may be simply broadcast on the LAN in the frequency band devoted to analog signals and a different frequency band is used for transmission of digital data implementing other services.

The function of the gateway 10 is to receive commands from the intelligent remote 30 and transmit appropriate commands and/or data to the headend cherrypicker to implement the command or interface functions needed locally satisfy the command. The gateway 10 also functions to receive digital data transmitted from the headend 12 and does all necessary processing and routing to output digital data as packets on local area network 28 addressed to the correct peripheral.

In alternative embodiments, the remote 30 may issue commands and receive data from settop decoder/adapter 36 coupled to the LAN and to television 34 and having suitable transceiver circuitry to talk to the remote 30. The commands are then packetized in the settop decoder 36 and sent to the gateway 10 via LAN 28 where they are routed to the headend 12 for implementation.

Remote 30 can be a personal digital assistant that has been suitably programmed with a remote control program 50 and which has built into it or added to it by an expansion card such as a PCMCIA card or a Visor Handspring expansion card an infrared or RF wireless transmitter 52. Preferably, the remote control 30 is a custom circuit which includes all the necessary elements. The necessary elements of a remote according to the invention include at least a keyboard 54 or other input device such as a touchscreen, touchpad, mouse, joystick or other pointing device and displayed icons for commands or any other known way of entering input data into a computer, a computer 56 programmed with a remote control application 50 and a memory 58 or some circuitry that carries out the functions of the remote control application to receive operator inputs and transmit them to the gateway 10 or settop adapter 36. In the broadest concept of the invention, the remote control does not need to have a display 60 and, therefore, it also does not need to have MPEG or other decompression programming or circuitry 62 nor does it need overlay program/circuitry 64 or frame buffer 66. Although the display, keyboard, and transceiver are shown connected directly to the CPU, in reality, they are connected to address, data and control buses driven by the CPU through suitable, conventional driver or interface circuitry.

The advantage of having display 60 and MPEG decompression software 62 and frame buffer 66 is that the remote control can be used to preview movies and the programs on other channels before purchasing the movie or changing the channel to the channel being previewed. The remote control 30 has its own address in the system as a separate peripheral. Thus, it can order and have video programs or game data or internet web page or e-mail data (or any other data supplied by the headend) sent directly to it. One of the advantages of having a remote with a display then is that the headend circuitry can send promotional trailers for video on demand movies, games, or other services to the remote control and can send the video of a channel designated by the remote to preview while the user is watching another channel on TV 34.

The broadest concept of the invention is illustrated in FIG. 2, and contemplates a remote control 70 without display that can issue wireless commands 72A to a headend 74 to invoke services provided thereby through one or more servers 76 that provide the requested service. Commands to the headend 74 and data sent in response thereto are transmitted through a broadband gateway or high data rate cable modem 78 in the home or through a settop box coupled to the high data rate gateway or cable modem. Wireless commands 72A or 72B are transmitted to a settop decoder 80 or a cable modem 78 or gateway. The settop decoder 80 is coupled to a television 82 by video and audio wires 84 and is coupled to the cable modem by a local area network or USB or firewire or SCSI connection symbolized by bus 86. Commands 72A received from the remote are routed by the settop decoder 80 to cable modem 78 via bus 86 for routing to headend 74. These commands cause said headend to send digital data to one or more peripheral devices coupled to the gateway or cable modem 78 such as settop decoder 80 or personal computer 88 which is also coupled to bus 86. The personal computer 88 can have broadband internet access via cable modem 78, transmission medium 14, headend cherrypicker 74 and internet server 90.

Remote control 70 can have any of the structures of remote 30 in FIG. 1 or it can be any other structure that can perform the functions attributed to it discussed herein. Remote 70 does not have a display or MPEG decompression circuitry or a frame buffer or any other circuitry to process incoming compressed video data in the preferred embodiment. In alternative embodiments, remote control 70 has a display, a frame buffer and MPEG or other decompression circuitry or software to decompress video and/or audio data and convert it to an analog signal format or digital data in a format that can be displayed. In other alternative embodiments, the remote also includes an optional speaker and/or earphone output jack represented by block 94 for playing decompressed audio data that has been converted to an analog sound signal. Of course suitable circuitry (not shown) to decompress audio data and convert it to an audio signal is present if the speaker and/or earphone jack are present. In this class of alternative embodiments, cable modem 78 or settop decoder 80 includes transceiver circuitry to transmit compressed video data to the remote control of a channel to be monitored on the display of the remote control or internet protocol (hereafter IP) packet data to be displayed. The compressed video data is then decompressed and either displayed on the display or converted to a proper signal or digital format for display and displayed on the display of the remote. IP digital data from internet server 90 such as web pages, streaming video etc. can be transmitted in either compressed or uncompressed format from the settop decoder 80 or cable modem 78 and displayed on optional display 92, and upstream data such as e-mail messages, URL addresses are sent from the remote's transceiver to the transceiver in the settop decoder 80 or cable modem 78.

In some embodiments, the cable modem 78 and settop decoder 80 can be combined into one unit that the TV 82 just plugs into.

Cable modems with LAN outputs or other type bus outputs are commercially available, and suitable settop decoders are disclosed in the parent application.

FIG. 3 discloses limited use customer premises system utilizing a wireless remote control that controls a specialized TIVO-like gateway that interfaces a television to a satellite dish to receive digitized video broadcasts or video-on-demand data from a digital video headend elsewhere and interfaces the television and wireless keyboard remote to the public service telephone network for bidirectional IP packet data transfers to and from the internet via an internet server at the central office. The system of FIG. 3 uses a remote control 100 in the form of a wireless keyboard or other infrared or radio frequency wireless remote control which allows e-mail data to be typed and URL addresses to be entered. The remote control 100 includes at least an infrared or RF transmitter to transmit data entered by the user to the specialized gateway 102. The gateway 102 is somewhat like a TIVO m recorder, but, unlike the TIVO, gateway 102 incorporates a digital TV satellite receiver 106 in it. This digital TV satellite receiver can be any known design such as the receivers used in the DirecTV™ or Dish Network™ digital television broadcast services or any equivalent circuit. Receiver 106 has an input that can be coupled to a small satellite dish 104 through which downstream compressed digital video broadcasts are received. The receiver functions to demodulate and detect the compressed digital video and audio data broadcast on each logical channel by the satellite system digital video headend 108 along with channel and program descriptor auxiliary data. One difference of the incorporated receiver 106 over the prior art DirecTV receivers etc. is that the prior art receivers contain circuitry to decompress the compressed digital video and audio data and convert it to analog video and audio signals but receiver 106 does not. These functions still need to be performed, but they are split out and performed in video decompression and conversion circuit 110 which is coupled to the receiver 106 and conventional modem 130 and transceiver 128 through a router or crossbar switching circuit 112. The reason for this is that gateway 102 includes a hard disk 114 which is used to record compressed digital video and audio data to perform TIVO or UltimateTV™ functions, as described further below. To conserve hard disk space, the data output from receiver 106 on bus 110 is left in the compressed state so that operating system 116 and CPU 118 can order switching circuit 112 to couple the output 120 of the receiver 106 to the input 122 of the hard disk 114 when a program is to be recorded. In this manner, incoming digital video data can be recorded on hard disk 114 in compressed form. If the digital video data is to be simply viewed and not recorded, operating system 116 controls CPU 118 to control switch 112 to couple output 120 of the receiver 106 to the input 124 of the decompression and conversion circuit 110. Circuit 110 then decodes the MPEG digital video broadcast packets to generate uncompressed YUV digital video data which is then converted in a video encoder (not shown) in circuit 110 to an analog NTSC, PAL or SECAM output video signal on line 126 for coupling to the video input of TV 82. Compressed audio is decompressed and converted in an audio processor (not shown) in circuit 110 to an analog audio signal for coupling to the audio input of TV 82.

Operating system 116 cooperates with the remote control 100 to receive commands to implement TIVO-like functions using the same programming as is used in the TIVO in addition to the other programming needed to do the other functions of the gateway and control switch 112.

These TIVO functions include any one or more of the following functions. Recording one or more video programs the user has specifically asked to record including timed recording and simultaneous recording. Timed recording allows recording in the future of specifically named programs using program guide data to identify the time and channel and duration. Timed recording also includes automatic recording at specified times on specified channels on specified days entered via remote control 100. Simultaneous recording allows the gateway to record two or more video programs simultaneously even if they are on separate logical channels (or different frequency carriers if two tuners or satellite receivers 106 are present) or to record one video program while simultaneously watching another program.

Another TIVO function is indexing downloaded program guide data to organize it into categories such as sports, movies, documentaries, etc. and to display a menu from which programs can be picked to record. The menu allows searching by name so that the user can spell out a word on her remote control that is likely to appear in the name and all the programs with that word in the title will be displayed and can be selected for recording. The menu also allows browsing by time and browsing by channel to pick programs to record. The menu also displays a category called "suggestions" which are shows the operating system thinks the user would want to record based upon learned characteristics of the user's viewing preferences. Shows from the suggestion list or from the search list or browsing lists can be selected for recording by a just selecting recording from a menu of actions such that "one touch" recording is implemented once that particular menu is reached. There is no need to define the day, week, channel and start and stop times thereby greatly simplifying the process.

Another TIVO function is pausing, rewinding, fast forwarding and playing live TV programs in slow motion or normal speed. Another TIVO function is instant replay that jumps the program you are watching back in time by 8 seconds each time the wireless remote control instant replay button is pressed, and a slow motion command can be given when an instant replay is being played to do the instant replay in slow motion.

Another TIVO function is to present a program banner at the time of the screen each time a channel change is made to display overlay data that identifies the program, channel and start and stop times of a program in case channel surfing is being performed.

Another TIVO function is providing the ability to record a program and any one of a plurality of selected quality or resolution levels. This is useful for watching sports at higher resolution than movies.

Another TIVO function is receiving and recording user preference commands for automatic recording when they are watching programs. In other words, if a user is watching either a live or prerecorded program and finds it interesting, a "thumbs up" command can be given one, two or three times to indicate the level of interest in this type of program. Another TIVO function is receiving and recording "thumbs down" commands for live or prerecorded shows the user finds not interesting. These "thumbs up" and "thumbs down" commands received from the user's remote allow the gateway or headend cherrypicker implementing the TIVO functions to do automatic suggestion of programs that the operating system thinks the user would like to record based upon learned patterns of viewing by this user based upon past recordings and user preferences as indicated by previous "thumbs up" and "thumbs down" commands given. These suggested programs are listed in the order of closeness to the perceived pattern of user preferences learned by the operating system. Any program on the suggestion list may be easily set up for recording by using wireless remote 100 in FIG. 3 to pick a "record this showing" menu command from a menu displayed on TV 82.

Another TIVO function is freeze frame and slow motion playback of recorded programs and high speed fast forwarding at one of multiple selected speeds to wind through commercials or other segments the user does not wish to watch.

Another TIVO function is the "season pass" wherein each time an episode of a specifically named program is broadcast on any channel on any medium to which the gateway is connected, the program is recorded.

Another TIVO function is a menu of the best programs and network showcases programs that will be broadcast in the next few days by the broadcast networks and a menu that allows quick setup for recording these shows.

Another TIVO function is the ability to configure the system to download program data for only the channels to which a user has subscribed.

Another TIVO function is displaying of a menu of programs that have been recorded and providing a menu to issue commands to play a program, delete it, save it until a specific date or save it until it is specifically deleted by the user.

Another TIVO function is to save the place where a user stopped viewing a program when the user stops watching a prerecorded program. The next time the user resumes watching that particular program, play starts from where she left off.

Another TIVO function is automatic downloading of program guide data via conventional modem 130 so the operating system knows what programs will be broadcast when on each logical channel on each medium to which the gateway is connected.

Another TIVO function is pausing live TV for a bathroom break, a phone call, etc. so that the program can be recorded and watched virtually simultaneously off the data recorded on the hard disk.

Another TIVO function is to display program guide data downloaded from a program guide server via modem 130 on said television 82.

A TIVO function that is not implemented is outputting of infrared commands to an infrared transducer affixed to an external digital video broadcast receiver to change the channels thereof in response to channel selection commands entered by remote control 100. This is a significant advantage because the TIVO prior art system gets confused and often records no signal at all when an uninitiated family member such as a child changes the channel on the separate digital TV satellite receiver using that receiver's remote control instead of the TIVO controller. This confuses the TIVO prior art system since if the channel is changed without using the TIVO controller, the TIVO system does not know to which channel the dish receiver is currently tuned. Strangely, the TIVO prior art system tunes an external digital video satellite receiver by sending it infrared "differential" commands. Thus, if the TIVO knows the receiver is tuned to channel 100 and the TIVO wants to record a program on channel 125, the TIVO will issue a command to increase the channel number by 25 either by giving 25 channel up commands or by giving a command to increase the channel number by 25 instead of simply giving a command "change to channel 125". This is a serious drawback if small children or TIVO-challenged people are using the TV.

Instead, operating system 116 receives wireless channel change commands from remote control 100 and sends control signals to receiver 106 to cause it to tune to the selected channel. Computer 118 is coupled to all circuits in the gateway 102 to control them via data, address and control lines (not shown) under the control of operating system 116.

The remote control 100 includes buttons, keys or displayed icons that can be invoked to control the gateway to implement each one of these functions. The operating system can implement all the other TIVO functions also as well as control the gateway to use the remote control and TV as a computer to browse the internet. This collection of TIVO functions is referred to in the claims as TIVO functions.

Decompression and conversion circuit 110 also serves to receive uncompressed data in IP packets from modem 130 and remote control 100 through receiver or transceiver 128 and convert it to NTSC, PAL or SECAM video (and possibly analog audio) signals for display on television 82. This allows the remote control, gateway and modem and TV to function as a personal computer and modem combination to view web pages, search the internet and send and receive e-mail without actually needing a computer.

Receiver 106 has the ability to tune and demultiplex two separate logical channels simultaneously in some embodiments. Typically, this will be done by filtering out all MPEG packets having two separate program descriptors (PID) and providing these MPEG packets to switching circuit 112. The packets for the two different PIDs can be sent to different places. For example, all the filtered out packets can be sent via switch 112 to operating system 116 which has previously received commands from remote 100 to view the program identified by a first PID on TV 82 and to record a program identified by a second PID on hard disk 114. The operating system will then transmit all packets containing the first PID to switch 112 and control switch 112 to route those packets to decompression and conversion circuit 110. The operating system then may simultaneously or later output the packets containing the second PID to switch 112 and control switch 112 to route these packets to hard disk 114 for recording. Likewise, one program's packets can be routed to decompression and conversion circuit 110 for viewing on TV 82 and another program's packets can be routed to remote control 100 for monitoring on an optional display therein. Remote control 100 may have any of the structures of remote control 70 in FIG. 2 or simply be a keyboard coupled, in some embodiments, to packetization circuitry to packetize the commands into IP packets, and an infrared or RF transmitter.

In alternative embodiments, the switch 112 will have routing capabilities based upon routing tables built therein by the operating system 116 based upon command received from remote 100. The router will then look at the PIDs in all incoming packets from receiver 106 and route them according to the data in its routing tables thereby eliminating the intermediate step of sending all packets to the operating system 116 and the need for the operating system 116 to buffer these packets while waiting to retransmit them.

Commands from remote control 100 are received by transceiver (if the remote has a display) or receiver (if the remote has no display) 128 and are coupled to switch 112 where they are routed automatically to the operating system. In alternative embodiments, the transceiver 128 may be coupled to switch 112 through local area network 86. In other words, the transceiver may have a network interface circuit and be out somewhere on the home network LAN 86. The transceiver then receives wireless commands from the remote control and those commands are packetized into LAN packets and routed or sent to NIC 164 which then routes them to switch 112 for routing to the appropriate destination such as operating system 116. Data to be sent to the remote is routed to NIC 164 and then sent over LAN 86 to the transceiver where it is transmitted wirelessly to the remote. The LAN may be any type of layer 1 and layer 2 protocol run over any existing wiring in the home or over LAN wires that have been added. For example, the LAN may be run on CAT 5 wiring, the existing CATV coax in the home, over the house's power lines or phone lines or by any conventional RF or infrared wireless LAN technology such as Blue Tooth (short distance, low power) or 802.11 (larger distances for office environments), etc. LAN technologies are commercially available from many sources including some of the newer technologies with proprietary protocols at layer 1 and 2 available from Inari, Itran and Itellon. NIC 164 and the NIC of the transceiver will be whatever is needed for the type of medium and protocols in use. In the claims, limitations regarding receivers or transceivers coupled to the switch for communicating with a wireless remote or words to that effect are intended to cover these embodiments where the transceiver is coupled to switch 112 via LAN 86.

The operating system then analyzes each command and outputs a suitably formatted command to switch 112 and controls switch 112 to route the command to the appropriate circuit. In some embodiments, operating system 116 may packetize commands to be sent to the internet such as requests to download web pages or send or receive e-mail as IP packets addressed to the appropriate IP address. In other embodiments, the remote control itself packetizes internet commands into IP packets. Wherever these internet commands get packetized, they are routed by switch 112 to a conventional PSTN modem 130 where they are transmitted over a PSTN subscriber loop 132 to a central office internet server 134. There, they are launched on a route to the appropriate server on the internet. The central office also includes a program guide server to download program guide data to gateways on a regular basis for storage therein so that each gateway knows which programs are going to be broadcast when on each logical channel of each medium to which the gateway is connected.

Referring to FIG. 4, there is shown a system that uses a satellite link for unidirectional downstream digital video transmissions and uses a gateway coupled to a hybrid fiber coaxial network of a cable television system for provision of bidirectional high speed internet access and other broadband services. The fundamental notion of the system species of FIG. 4 is that broadband, digital video links via DirecTV and Dish network already exist and work well so there is no point in using up valuable bandwidth on the HFC network for digital video transmissions when that bandwidth can be used to provide high speed internet access and other broadband services such as centralized security camera monitoring of customer premises from the headend, interactive game playing with a game server at the headend, audio-on-demand from an MP3 or other digital audio server at the headend, etc.

The system uses a home gateway 10 which is coupled by a local area network 86 to one or more peripherals. These peripherals include a personal computer 88, a settop decoder 80 coupled to a TV 82 by analog audio and video signal lines 84, and a digital video security camera 46. The gateway 10 is also connected to a digital video headend video server 108 via a satellite uplink and downlink and a satellite dish 104. The gateway 10 incorporates tuner, demultiplexer and authorization circuitry from conventional digital video satellite receivers therein, but the decompression circuitry to decode the MPEG or other compression to YUV format digital data and conversion circuitry to convert the YUV format and other audio and/or auxiliary digital data of digital TV broadcast program to analog NTSC, PAL or SECAM video signals is placed in the settop decoder 80. This allows the network 86 to carry only compressed digital video data in packets. Settop decoder 80 also includes a network interface card (NIC) to pluck LAN packets off network 86 addressed to it. The personal computer and security camera 46 also include NICs to send and receive packetized LAN data addressed to each device over LAN 86 with the gateway 10.

Optionally, if pay-per-view events are to be requested, gateway 10 includes a conventional modem to transmit data to digital video headend 108 over the PSTN 142. These commands are entered wirelessly via remote control 70 via RF or infrared transmission circuitry in the remote and gateway. The remote control, in the preferred embodiment, includes a display 92 and audio transducers and/or earphone jacks 94, but in more basic embodiments, does not. Commands from the remote 70 may also be routed to the digital video headend 108 via the HFC 144, headend cherrypicker 74 and a PSTN interface 146 in the form of a conventional modem which is internal or external to the cherrypicker 74. The cherrypicker can be any conventional cherrypicker or the cherrypickers disclosed in the patent applications incorporated by reference herein.

The cherrypicker is coupled to a video server 76, an internet server 90, a game server 148, a security camera server 150 coupled to a plurality of security monitors 152 and an MP3 or other digital audio server 154 to provide audio-on-demand services. The cherrypicker 74 functions to receive commands from the remote control 70 or other command console or personal computer coupled to gateway 10. The cherrypicker responds to these commands by issuing the proper commands to the proper server to cause transfer of digital data from the server(s) to the gateway 10 and the requesting peripheral over LAN 86 or the wireless connections 72A or 72B to the remote 70.

FIG. 5 is a block diagram of one embodiment for a gateway 10 in FIGS. 1 and 4 which have the ability to implement TIVO functions as well as interface the peripherals coupled to the gateway to two different broadband digital data delivery systems, specifically, digital video data broadcast systems and high bandwidth digital data services delivered over and HFC cable plant. The gateway 10 is quite similar to gateway 102 of FIG. 3 except that gateway 10 includes a cable modem 160, a rate shaping circuit 161 and a local area network network interface card or external bus transceiver 164. It may also, optionally, include an MP3 server 163.

The cable modem 160 can be any of the existing cable modems including DOCSIS cable modems. In some embodiments, a DSL modem can be substituted for the cable modem for high bandwidth exchanges with the headend over DSL lines instead of HFC. In other embodiments, a bidirectional, high bandwidth satellite modem such as a Starband modem may be substituted for cable modem 160. In other embodiments, a wireless local loop modem may be substituted. In still other embodiments, one or more of these different types of modems may be simultaneously present through a modular plug in connection to the gateway or all may be present permanently incorporated into the gateway circuit. All of these different combinations are referred to in the claims as a "high bandwidth digital data communication means". All of these possibilities will hereafter be referred to as simply the "cable modem" even though it might be a satellite or DSL modem or a combination of multiple high bandwidth modems and multiple high bandwidth data paths.

The cable modem 160 is coupled to switching circuit 112. This allows incoming IP packet data or MPEG packets containing IP packets or video and audio and auxiliary data of television programs or other services to be routed to the correct destination circuit under control of operating system 116. The control computer 118 and operating system 116 (the operating system refers to all the computer programs needed for the various applications that the gateway can perform and not just the bare operating system like Windows, MAC OS, Solara, Linux, etc. although the bare operating system is part of the computer programs referred to by block 116). The control computer also can control the cable modem 160 to automatically download program guide data from a source at the headend or from a source on the internet through a web server at the headend in embodiments where the conventional modem 130 is not used for this purpose.

One new destination circuit to which the data from either the cable modem 160 or operating system 116 or transceiver 128 or conventional modem 130 or decompression and conversion circuit 110 may be routed is local area network interface card or bus transceiver 164 (hereafter NIC 164). NIC 164 receives digital data in IP or MPEG packet format or any other format and encapsulates it into LAN packets (such as Ethernet packets) or cells (such as ATM cells) for transmission to the peripherals coupled to LAN or bus 86 or to a LAN hub or switch. The LAN 86 can be one or more LANs and can be managed by an intelligent hub, a switching hub or a dumb repeater hub, so NIC 164 will be whatever interface is necessary for the type of LAN 86 is.

In case line 86 represents a bus, the incoming data to NIC 164 is transmitted to the peripherals using whatever bus protocol is native to bus 164. Thus, with gateway 10, a user can use the remote 70 in FIG. 4 to control viewing on TV 82 of digital video broadcasts and simultaneously use remote 70 or personal computer 88 in FIG. 4 to control broadband browsing of the internet via cable modem 160 and NIC 164 and/or to invoke TIVO functions. In some embodiments, conventional modem 130 is used only to automatically or manually download program guide data from a program guide server 162 via a conventional phone line to support the TIVO functions gateway 10 performs in the same manner as gateway 102 in FIG. 3.

One additional function that gateway 10 can perform is to receive IP or MPEG format packet data encoding video program data or broadband internet access or other broadband servers received from the headend cherrypicker 74 via the high bandwidth digital data communication means. The computer 118 controls switch 112 to supply the broadband data to any destination including the rate shaping circuit. Likewise, high bandwidth data from any source including the rate shaping circuit 161 may be routed to the high bandwidth digital data communication means 160 for transmission upstream. For example, received high bandwidth video data can be routed to the decompression and conversion circuit 110 for viewing on TV 82 or to NIC 164 for transmission to a peripheral or to transceiver 128 for transmission to the remote for viewing on the remote's display. The decompression and conversion circuit strips the payload data out of each such packet and does a reverse segmentation and reassembly process and converts the resulting data to analog video and audio signals for output on video and audio lines 126 and 127 for display on television 82. This allows such things as games being run on a headend game server to be displayed on televisions at customer premises and allows video-on-demand or other video-based services provided by a video server at the headend (e.g., 76 in FIG. 4) to be ordered by the wireless remote and displayed on television 82 or sent to a computer coupled to NIC 164.

Note that when the gateway of FIG. 5 is used as gateway 10 in FIG. 4, the functions of settop decoder 80 are performed by decompression and conversion circuit 110 in FIG. 5 so the settop decoder 80 is not present in FIG. 4 and the TV 82 plugs directly into the gateway 10.

The gateway of FIG. 5 also has a rate shaping circuit 161 which is coupled to switch 112. This rate shaping circuit is one or more transcoder integrated circuits and any needed support circuits. It functions to receive high bandwidth data and alter the data rate to match the available bandwidth of the data path on which the data is to be transmitted. The rate shaping circuitry is controlled by computer 118 to alter the bandwidth of data routed through it by switch 112 to match the available bandwidth of whatever data path the data is to be transmitted on. This allows bottlenecks on LAN 86 or the medium 144 to the headend to be managed by lowering the data rate of the data to be transmitted. Since the data rate of compressed video programs varies with the amount of motion in the picture, the transcoders 161 allow the variable data rate to be altered to match the available bandwidth of the data path. The headend CMTS circuitry knows how much bandwidth is available on HFC downstream and upstream at any particular time at least in DOCSIS cable modem systems since the headend assigns bandwidth and the total available bandwidth on the HFC is fixed. Likewise, the gateway control computer 118 knows how much bandwidth is available on LAN 86 at any particular time since computer 118 controls the routing of data onto LAN 86.

Referring to FIG. 6, there is shown a block diagram of the preferred architecuture for a cable headend to perform TIVO functions for each customer at the headend. The headend of FIG. 6 also delivers to customers internet or other non video data such as internet protocol packets from internet servers 284 or any of the other servers to which the headend circuitry is connected (hereafter iData). The headend also delivers to the customers video-on-demand data (hereafter VOD) and/or broadcast or "pushed" video programs (video programs from a video server at the headend which are broadcast at regularly scheduled times) supplied by broadcast networks 280 or near video on demand video servers 281 to customers via HFC 250.

The downstream and upstream path to the customers is a shared hybrid fiber coax (HFC) cable plant 250. A plurality of network cherrypicker multiplexers 252 through through 262 marked NCP function, inter alia, to send Ethernet packets to the packet switch 210 telling it which MPEG packets transporting data for a particular desired program or service each cherrypicker switch wants. Each requested packet is defined in terms of an Ethernet station address. Video programs broadcast by networks 280 via satellite and provided by near VOD video servers 281 or video on demand servers in server farm 282 and data provided by other servers in server farm 282 are in MPEG transport streams with packets encoding a particular program or service each have a program identifier or PID that identifies that program or service. The same is true for iData encapsulated in MPEG packets in MPEG transport streams output by servers in application server farm 286 or by web servers in cloud 284. Each of these video data and iData sources outputs MPEG transport streams having PIDs therein, and is coupled to packet switch 210 by an IP wrapper circuit such as 276, 278 or 279. The function of the IP wrapper circuits is to break the MPEG transport streams on input lines 283, 285 and 287 up into individual MPEG packets and encapsulate these MPEG packets in multicast IP packets.

These IP packets are themselves then encapsulated by the IP wrapper circuits into Ethernet packets addressed to an Ethernet station address that corresponds to the PID. Every audio, video or IP data packet source can have its own unique Ethernet station address and can be requested by the NCPs using that Ethernet station address. In alternative embodiments, every MPEG transport stream multiplex has its own unique Ethernet station address. Each such multiplex would carry MPEG packets from a plurality of programs, each program having its own unique PID.

TIVO functions are implemented using hard disk array 289, packet switch 210 and system control computer 244. The hard disk array receives MPEG compressed data packets to be recorded via bus 301 output from an IP dewrapper circuit 305. The IP dewrapper 305 receives MPEG video data packets encapsulated in IP packets which are encapsulated in Ethernet packets on bus 307. The IP dewrapper 305 strips off the Ethernet and IP packet headers and outputs MPEG packets on bus 301. MPEG data packets encoding TIVO function menus and recorded video programs are output on bus 303 to IP wrapper circuit 276 where they are wrapped in IP multicast packets and Ethernet packets having Ethernet station addresses corresponding to the PIDs of the MPEG packets output on bus 303.

Hard disk array 289 is segmented into multiple storage areas, each area dedicated to implementing TIVO functions for one subscriber. Menu data may be stored in a common shared area. Menus to be displayed on the televisions at the customer premises to allow TIVO functions to be invoked have one or more PIDs assigned to them. These menus are output as MPEG streams on line 291 from the hard disk array to IP wrapper circuit 276. The same is true for MPEG streams encapsulating programs that have been recorded at the customer request or live TV programs the customer is watching and wants to use TIVO functions on such as slow motion, instant replay, stop, fast forward or rewind. The IP wrapper circuit encapsulates these menus, live program data and auxiliary data, and prerecorded programs into multicast IP packets. These IP packets for each PID are then themselves encapsulated into Ethernet packets addressed to an Ethernet station address that corresponds to the PID. Thus, the customer can use his wireless remote at his premises to request TIVO menus and invoke TIVO commands record programs, search for programs, and do all the other TIVO functions.

Each NCP receives from control computer 244 information about which programs and or services including data for displays of menus needed to invoke TIVO services or TIVO recorded programs customers have requested. These requests are made using the wireless remotes such as remote 30 in FIG. 1 and transmitted upstream from the customer gateways and are received via cable modem 246 in the headend 12. The requests are routed by switch 210 to management and system control computer 244. The control computer then assigns the requested data to a particular logical channel and sends a downstream message via cable modem 246 to the customer telling that customer's gateway to which logical channel to tune to receive the requested broadcast or VOD or TIVO recorded video program, service data, TIVO menu, etc. The requested data is then displayed on a television, computer, game system etc. coupled to the gateway. The management and control computer 244 then controls switch 210 to route the requests to whichever NCP has been assigned to service the request according to the channel assignment. The NCP then sends a request packet to the packet switch 210 which identifies the requested program, menu etc. by the corresponding Ethernet station address. Packet switch 210 functions to receive the packets from each NCP designating which Ethernet station addresses for which it wants packets sent to it. The packet switch 210 then sets up a data path and routing table or other routing circuitry in the to route packets with the designated Ethernet stations addresses out on the proper LAN segment to the cherrypicker switch that requested them. Any Ethernet packets output by IP wrapper circuits 276, 278 or 279 having the requested Ethernet station address are then routed to the NCP that requested it.

Each NCP transmits a different MPEG transport stream encapsulated in IP packets encapsulated in Ethernet packets in embodiments where the gateway that can receive Ethernet packets containing IP packets containing MPEG packets and strip off the Ethernet and IP packet headers, repacketize them into LAN packets for whatever network is coupled to the gateway and route them to the settop decoder of the correct peripheral. The settop decoders must have the capability to decompress the MPEG packets to generate video and/or audio signals. In embodiments where the gateways are not capable of receiving data in this format or the downstream medium transport stream cannot handle data in this format, an IP dewrapper circuit (not shown) is used for each NCP or shared by them all. The IP dewrapper circuit(s) function to strip off the Ethernet and IP packet header information and sort out the different MPEG transport streams and route them to the appropriate FDMA channel and logical channel therein of the appropriate downstream HFC transmitter (or DSL modem or satellite uplink transmitter in other embodiments).

The packet switch 210 sends to the cherrypicker switches only the packets that have been requested. This is different than the prior art cherrypicker structure with splitters where each cherrypicker switch received MPEG stream packets from the splitters that had to be rejected because they were not for programs the cherrypickers wanted. This is one fact that improves the performance and scalability of the cherrypicker system of FIG. 6. By using packet switch 210 instead of splitters, less processing time is wasted in the cherrypicker switches rejecting packets that will not be incorporated into the MPEG transport streams each cherrypicker switch is generating.

The cherrypicker switches have front end processing circuitry and software that the prior art cherrypicker multiplexers did not have to be able to receive LAN packets encapsulating TCP/IP packets. The cherrypicker switches also recognize the LAN addresses and TCP/IP addresses and use that information generated from the PIDs to sort the incoming packets into one or more MPEG transport streams going to video-on-demand and/or customers who have requested internet data or other data from servers coupled to the packet switch 210. The cherrypicker switches 252 through 262 also optionally recode at least the VOD and/or other video program data to the proper bandwidth for the downstream available bandwidth and repacketize the recoded data into MPEG packets. This recoding can be done by integrated circuits commercially available from the assignee of the present invention. In some embodiments, the cherrypicker switches packetize the MPEG packets into UDP/IP packets and Ethernet packets addressed to an optional separate, shared IP dewrapper circuit 211. The IP dewrapper circuit strips off the LAN and UDP/IP packet headers and reassembles each MPEG transport stream and outputs it on bus 213 to the proper transmitter 264, 266, 268, 270, 272 or 274 for downstream transmission. In other embodiments, each NCP 252 through 262 has its own IP dewrapper circuit. In other embodiments, each NCP outputs one or more MPEG transport streams wrapped in IP packets directly to its own transmitter(s).

Cable modem 246 sends non video data downstream and receives upstream commands and data from the gateway and remote control at each customer premises. Cable modem 246 is comprised of an upstream receiver 247 and a downstream QAM modulated transmitter 249. The receiver 247 receives upstream VOD requests and upstream iData and wireless commands to invoke TIVO functions. The cable modem transmitter 249 transmits command and control messages downstream that tell each gateway on which logical channel to find its requested data. Cable modem transmitter 249 also sends iData downstream to provide broadband internet access and other services. In other embodiments, the command and control messages and/or iData is transmitted downstream via the cherrypickers and their associated downstream cable modems marked 264 through 274. In some embodiments, the cable modem 246 is used also to transmit and receive voice-over-IP packets when packet switch 210 has an interface to the PSTN.

The cable modem 246 can be any conventional cable modem design and many different types are commercially available. The preferred embodiment for the cable modem is any DOCSIS modem or the cable modem defined in EPO patent publication 0955742 published Nov. 10, 1999 or EPO patent publication 0858695 published Aug. 19, 1998, both of which are hereby incorporated by reference.

Cable Modem Termination System (CMTS) 276 is conventionally designed circuitry that, for the preferred embodiment, does all the interleaving, insertion of time stamps, ranging, training, adaptation of receiver amplitude and phase correction factors from preamble data etc. needed to support the receiver and transmitter of the cable modem. A suitable CMTS circuit is disclosed in U.S. patent application entitled APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM published as EPO publication 0955742 on Nov. 10, 1999.

Packet switch router 210 is conventional in structure and routes LAN packets on a LAN links 277 to the cable modem 246 and on LAN links 279, 281, 283, 285, 287 and 289 to all the NCPs. The packet switch router is also coupled by LAN links 291, 293, 295 and 297 to multiple sources of Ethernet or other LAN packets encapsulating IP packets encapsulating MPEG video data and iData. MPEG video data or iData encapsulated in UDP/IP packets encapsulated in LAN packets addressed as previously described are supplied to the packet switch 210 from IP wrapper circuits 276, 278 and 279. IP wrapper 276 encapsulates MPEG packets from MPEG transport streams supplied from broadcast sources such as satellites and other cable system headends, as represented by cloud 280. IP wrapper circuit 283 also wraps MPEG packets for TIVO menus and TIVO video services coming from hard disk array 289. IP wrapper circuit 276 also wraps MPEG video packets from near VOD servers 281. IP wrapper circuit 278 supplies LAN packets encapsulating MPEG video packets and other TCP/IP packets supplied from servers in server farm 282. IP wrapper circuit also serves to receive LAN packets addressed to web servers in internet cloud 284 and other servers in server farm 282 and to strip off the LAN packet headers and IP headers and output MPEG packets to the servers.

The servers in server farm 282 include VOD servers, game servers, EMM servers that supply weather, news, stock market data and messages associated with TV programs, electronic program guide servers, Tmail servers that display e-mail on customer TVs, data carousel servers, and TIVO-like personal video recorders in alternative embodiments where the TIVO functions are implemented by one or more servers at the headend instead of being controlled by system control computer 244. Server farm 282 can also include banks of transcoder servers to adjust the data rate of various streams of data. These transcoder servers receive MPEG packets of video, TIVO menus or iData to be transmitted downstream to a customer and reduce the data rate according to rate shaping commands received from the system control computer to match the available bandwidth for transmissions to the customer who requested the data. The rate adjusted data is then sent to the packet switch and routed to the appropriate NCP and transmitter for downstream transmission.

Near video on demand servers 281 are servers that broadcast pay-per-view video programs on a frequent basis, usually the same movie over and over. Personal video recording servers are TIVO servers at the head end that record video programs requested by users in upstream requests and perform the other TIVO functions such that each customer can have a personal TIVO space at the head end with the TIVO functionality implemented by shared hardware and software. Other types of servers in the server farm can include web servers that convert HTML packets from the web servers in internet cloud 284 or from web servers in the server farm 282 to MPEG or other data formats so that users without computers can surf the web using their TVs and wireless keyboards or wireless remotes or other devices. Tmail servers are computers that convert e-mail messages to MPEG or other video data that can be converted to a video signal that can be displayed on a user's TV to allow the user to send and receive e-mail using their TVs and using wireless keyboards or wireless remotes. Data carousel servers serve up data similar to teletext messages. Transcoder servers transform streaming video and streaming audio TCP/IP packet streams into MPEG 2 or MPEG 4 transport streams and convert MPEG 1 transport streams to MPEG 2 transport streams, and convert quicktime and real player formatted data in TCP/IP packets to MPEG 2 or MPEG 4 transport streams.

The packet switch router 210 also receives LAN packets encapsulating TCP/IP packets from web servers in internet cloud 284 and from applications servers in application server farm 286. These packets are encapsulated in MPEG packets and are encapsulated by IP wrapper circuits 278 and 279 into LAN packets for routing by packet switch 210. The web servers allow users at home or in the office with their computers to have internet access through the HFC plant 250 at much higher speeds than dial up connections to ISPs.

The application server farm 286 can include advertising servers that send advertisements out to customers via MPEG transport streams or TCP/IP streaming audio or video or other formats. The application server farm 286 can also include Tcom servers that send and receive packets that allow customers to carry out telephone or videophone communications from their computers or televisions using wireless keyboards or wireless remotes to dial and microphones and speakers in the wireless keyboards or wireless remotes. The Tcom servers interface to the public service telephone network or high bandwidth services like T1, partial T1, frame relay or point to point networks and share the capacity thereof through the head end and do the packetization and depacketization necessary to provide voice-over-IP. The application server farm 286 can also include game servers that send and receive packets that allow customers to play games on the game server at the head end remotely from their computers or televisions at home. Other possibilities are chat servers that allow customers to enter chat rooms on the internet or local chat rooms restricted to the customers of the cable system, and statistical servers that serve up any kind of statistical information. Other possibilities are security servers that send and receive packets that carry MPEG video data from security cameras in user's homes or offices that can be viewed by security service personal at the head end, and banking servers that allow customers to carry out electronic banking from their computers or televisions at home.

A management and system control computer 244 functions to control and coordinate operations within the head end to supply the above mentioned services including, in some embodiments, implementing the TIVO functions, as described above. In addition to the functions of routing VOD requests and sending downstream messages to implement VOD, computer 244 also sends messages to transcoder servers in server farm 282 to control the bandwidth of the recompression processing. In some embodiments, each NCP includes its own transcoder. In addition, computer 244 also performs the following functions: manage subscribers to verify subscribers are authorized to receive what they have requested; send encryption key messages to the transmitters of the cable modem and cherrypicker transmitters to encrypt iData and video program data that customers have ordered so only the customers who have subscribed or paid can view or use the data; provisioning and directory management; network management such as bandwidth allocation and load balancing; reporting and analysis for management purposes; data management; and call center operations and other customer support functions. In addition, computer 244 coordinates with CAS system 288 and billing system 290 manage payment for services rendered.

FIG. 7 is a block diagram of a more generalized architecuture for a cable headend, central office or satellite uplink facility, represented by cloud 292. This headend facility can deliver iData and VOD and/or broadcast video data to customers and perform TIVO functions for each subscriber via HFC, DSL or satellite. The embodiment of FIG. 7 perform TIVO functions for each customer using one or more personal video recorder (PVR) servers at in application server farm 286. These servers implement all the TIVO functions identified above using their own computers and hard disk storage by cooperating with system control computer 244 to control packet switch 210 to route video packets to be recorded to the PVR servers. The switch 210 is also controlled to route video packets encoding TIVO menus and recorded program playback data to customer gateways via the appropriate NCP and transmitter.

Referring to FIG. 8, there is shown a block diagram of an advanced home gateway with built in TIVO video server, multiple broadband interface capability, multiple LAN interface capability and built in email, web server, answering machine, voicemail and PBX functionality. This gateway has a front end section 300 which includes one or more broadband interface circuits and a remote transceiver for wireless communication to a wireless remote control. These preferably are modular for expandibility, and can include: an HFC pure SCDMA cable modem, a DOCSIS 1.1 or 1.0 or other DOCSIS cable modem, a digital satellite receiver or transceiver such as a Dish Network receiver or Starband modem, a terrestial broadcast tuner, a wireless local loop transceiver, OC-1 or OC-3 interface transceivers, and/or XDSL (any Digital Subscriber Line) modem. The front end 300 also includes a wireless remote interface for bidirectional communication with a remote (not shown). In some embodiments, block 300 can include one or more conventional analog tuners to tune to selected frequency division multiplexed analog CATV broadcasts and provide the analog signals regular televisions without settop adapters coupled to the gateway by dedicated coaxial cable lines and/or a single coax lines and splitters for drop lines to each TV. This provides a standard CATV decoder analog tuner function on top of the digital services provided.

These circuits in block 300 function to interface the gateway to one or more broadband digital data delivery mediums for downstream only or bidirectional digital data communication and to the wireless remote. All combinations will include at least one transceiver so that upstream commands from a wireless remote can be sent.

The receivers/modems are interfaced to a router 302 by a section of circuitry 304 which includes an MPEG transport demultiplexer, a video decoder, an MPEG encoder, a conditional access decryption circuit and a rate shaping circuit. The rate shaping circuit will be present in all species to change the data rate of data travelling in both directions (headend to peripheral and peripheral to headend) to match the available bandwidth. However, the other circuits in block 304 will be controlled to only be used where necessary because of the type of data or signal received by block 300 or the type of data or signal to be transmitted to the headed by block 300. For example, the MPEG transport demultiplexer will only be used when the received data includes an MPEG transport stream containing more than one PID to separate out the MPEG packets having different PIDs and group them together in the proper order. Likewise, the A/D converter and video decoder, MPEG encoder and IP packetization circuit 306 will be used when an analog video broadcast signal is received. Such signals need to be digitized, converted to YUV format data, MPEG compressed and packeted into an IP packet for transmission over the LAN. The conditional access circuit will be used only when the received data is a pay-per-view data or is encrypted such that only paid subscribers can use the data and functions to do the necessary decryption and/or conditional access gating. Basically, whatever processing is needed prior to IP packetization on the signals output from whatever transceiver in the transceiver section 300 that received the signal or data is performed by the appropriate circuitry in block 304.

The IP packetization circuit 306 received compressed video data and other auxiliary and iData from the headend which needs encapsulation into IP packets and encapsulates the data into IP packets addressed to process in the settop decoder of the TV or the wireless remote control where the video program is to be viewed or some other peripheral that needs iData. The IP packetization process performs the reverse process for data being transmitted to the headend by stripping off the IP packet headers in some embodiments and leaving them on in other embodiments. The process to which the data is addressed in the IP packet header is the MPEG decompression process where the data is decompressed prior to conversion to a format which can be displayed.

IP packetization circuit 306 also serves the function of the IP wrapper circuit 276 of FIG. 6 to wrap the IP packets in LAN packets, preferably Ethernet LAN packets, having a LAN station address that is mapped to the PID of the video program encoded in the packets. This way router/packet switch 302 can be an inexpensive LAN packet switch in the preferred embodiment. In such embodiments, after the router has sent the packets to one of the LAN NIC interfaces 310 through 318, if the LAN headers are not of the type used in the protocol implemented by the LAN NIC, the NIC strips off the LAN headers and puts new LAN headers on which are addressed to the peripheral that ordered the service. Host 308 will communicate with each NIC and give it mapping information to map the addressing information in the LAN packet headers coming out of the router into the LAN address space of the NIC in question.

Home PNA LAN NIC 310 includes all the software and hardware to manage and communicate over a PNA LAN.

NIC 312 contains all the hardware and software to manage and communicate over an IEEE 802.3 or 802.5 Ethernet protocol LAN implemented on Category 3, 4 or 5 unshielded twisted pair wiring or over shielded twisted pair or coaxial cable.

A wireless LAN is implemented by the hardware and software of NIC 314 to provide physical layer and media access control (MAC) protocols according to the IEEE 802.11 standard for longer distance wireless links than Blue Tooth LANs can provide. NIC 316 implements the Blue Tooth LAN physical and media access control hardware and software protocols. NIC 318 implements the hardware and software to manage and communicate over power line and/or telephone line LANs and provides the physical layer and media access control circuitry and protocols to do so.

LAN NIC 319 implements the hardware and software to manage and communicate over frequency division multiplexed upstream and downstream local area network channels on existing cable television coaxial cable already in existence in a customer premises. NIC 319 provides the circuitry to receive LAN packets from router 302 and strip off the LAN packet headers and put on LAN packet headers suitable for the CATV coax LAN and transmit them on the proper outbound frequency channel. NIC 319 also provides the circuitry to receive LAN packets from the inbound frequency channel, strip off the LAN headers and repacketize the encapsulated IP packets into LAN packets of a type router 302 understands and send them to router 302.

These NICs 310 to 319 may be coupled to the gateway via modular connections. This structure is referred to in the claims as "modularly connected".

This protocol translation function of stripping off LAN headers of packets coming from the router and repacketizing into different LAN packets understood by the LAN NIC protocols and vice versa, and transmitting and receiving according to the appropriate protocols on whatever type LAN is connected to the NIC happens in all the NICs 310 through 319. An additional function and advantage of packet switch/router 302 is to allow peripherals on any one of the LANs coupled to NICs 310 through 319 to communicate with each other through the router 302 and the individual NICs acting as bridges between protocols. Thus, smart appliances like refrigerators, microwaves, heating and air conditioning units coupled to a power line LAN can be controlled from a personal computer on a different LAN such as an 802.3 LAN through router 302 and NIC 318 and NiC 312 or through a wireless remote control. In embodiments where there is only one LAN with a shared coaxial cable medium with splitters to split off drop lines to various peripherals, the peripherals can still communicate with each other through the splitter's inherent leakage from one line to another.

However, in alternative embodiments, router/packet switch 302 can be an IP packet router and packetization of the IP packets into LAN packets occurs at the appropriate NIC to which the IP packets are routed. The various prior art LAN technologies, topologies and protocols that can be used are not limited to the examples described here. Additional examples and more detail about existing LAN technologies, routers, packet switching, media access control, internetworking, video communications, digital TV, compression and bandwidth, MPEG, WAN video networks, congestion management and latency, ATM protocols over HFC or pure fiber WANs, LAN-based video networks, gateways, satellite, DSL and cable modems can be found in Horak and Miller, *Communications Systems and Networks: Voice, Data and Broadband Technologies*, ISBN 1-55851-485-6 (M&T Books 1997) Foster City, Calif., which is hereby incorporated by reference.

The IP packetization circuit determines which IP destination address to use in constructing the IP packets via data received from the host microprocessor 308. When the original request for the program was received by one of the LAN NICs 310, 312, 314, 316 or 318, it has the LAN packet header stripped off by the NIC and the IP packet containing the request is sent to router 302. The router 302 sends it to the host microprocessor 308. The host microprocessor 308 determines from the LAN packet source address containing the request which peripheral's network adapter/transceiver transmitted the request on the LAN. The IP address of the MPEG decompression process in this network adapter is then transmitted by the host 308 to the IP packetization circuit along with the PID of the requested program via the router 302. The host 308 then forwards the request to the appropriate transceiver in block 300 via router 302 for transmission to the headend. Later, a downstream message is received from the headend that gets routed to host 308 and tells the host which logical channel(s) and subchannel(s) the data encoding the requested program will be arriving on. The host 308 then sends a command via router 302 to the appropriate transceiver/modem in block 300, where necessary, to control it to tune to the right logical channel(s) and subchannel(s) to receive the data. In this example, logical channel is the frequency of the carrier and logical subchannel is the timeslot, spreading code or PID used to transmit the data of the requested program in this example. Host 308 then sends a message via router 302 to the MPEG transport demultiplexer telling which MPEG packets to pick out from the received MPEG transport stream. A message is then sent to IP packetization circuit 306 via router 302 telling it to which IP address to address the IP packets containing the MPEG packets picked out by the MPEG transport demultiplexer. The host then sends a message to router 302 telling it to which NIC to route those IP packets. At the NIC, the IP packets are encapsulated into whatever type packet is used in the particular protocol implemented by the NIC, and they are transmitted to the proper NIC on the LAN or the proper wireless transceiver. The receiving NIC or transceiver then strips off the LAN packet header and routes the IP packet to whatever process the IP packet is addressed to, usually an MPEG decompression process in the case of MPEG packets containing data. In the case of MPEG packets containing IP packet data implementing broadband internet access, the outer IP packets are addressed to a browser or e-mail client on a PC somewhere.

In the embodiment of FIG. 8, no separate transceiver for the wireless remote is shown. This is because the wireless remote may send commands to or receive data from the gateway via one of the wireless NIC adapters 314 or 316. In alternative embodiments, the wireless remote may exchange commands and data with some settop decoder out on one of the LANS and then the commands and data are exchanged with the gateway via LAN packets.

Each of the NICs 310 through 318 uses a different transmission medium and may use a different protocol. Some are wireless, some use existing wiring in the home such as power or phone lines and NIC 312 uses custom CAT 5 wiring added to the home.

A DHCP server 320 assigns IP addresses to clients on the LANs and in the gateway when they power up. TIVO video server and bulk storage hard drive 322 implement some or all of the TIVO functions previously described. DVD player 324 is a shared DVD player in the gateway that allows a DVD to be watched on any TV in the home by encapsulating the raw digital video data from the DVD disk into an IP packet addressed to the settop decoder that requested the DVD. The IP packet is then encapsulated by the DVD player into the type of LAN packet that the router 302 uses. This LAN packet will be addressed to the MPEG encoder in block 304. The router 302 sends it to the MPEG encoder which strips off the headers and compresses the video data. The compressed data is then sent to IP packetization circuit 306 for IP packetization addressed to the requesting settop decoder. The IP packetization circuit then encapsulates the IP packet into a LAN packet of the type the router 302 switches and sends it to the router in embodiments where the router 302 switches LAN packets (no LAN packet encapsulation is necessary if router 302 is an IP packet router. The resulting IP packets are then routed to the appropriate NIC by router 302 under control of host 308 and are there re-encapsulated in the appropriate LAN packet for the protocol implemented by the NIC and transmitted to the requesting settop decoder.

The router 302 is a conventional LAN packet switch in embodiments where block 306 is an IP wrapper that wraps IP packets in LAN packets, and is an IP packet router where LAN packet encapsulation does not occur in block 306. Router 302 functions to use addressing information in the packet headers and routing tables built from data supplied by host 308 as to where everything needs to go to route data to the proper destination. Router 302 is also coupled to optional display 323 and keyboard/pointing device 325 peripherals through suitable interfaces 326 and 328, respectively. The display and keyboard allow the gateway to be controlled directly from the keyboard and display as opposed to through a wireless remote transceiver interface 327 and router 302. Wireless remote transceiver interface sends and receives wireless commands and data to a wireless infrared or RF remote possibly having a display and does all interfacing needed including LAN packetization to get commands and data routed by router 302 to host 308, TIVO server 322, the headend or other destinations to control the gateway and/or headend to supply the requested services to the requested peripherals.

In some embodiments, the gateway's host 308 will have added functionality programs stored in memory 324 to provided added capability to the gateway as email, voicemail, PBX functions, web server functionality and a shared answering machine.

An e-mail program 330 provides the capability for email to be sent and received via a television set and wireless remote or wireless keyboard out on the local area networks. The e-mail program controls host 308 to control the router such that LAN packets containing IP packets containing requests to retrieve e-mail are routed to host 308 and email process 330. The e-mail process then controls host 308 to generate an IP packet addressed to the mail server of the internet service provider (ISP) of the customer that made the request and sends it to router 302 to send to the appropriate transceiver in block 300 or to conventional modem in PSTN interface 332 for transmission to the headend server coupled to the internet for transmission to the ISP mail server or via the PSTN to the ISP's mail server. The ISP mail server then sends back IP packets addressed to the e-mail process 330. These packets get routed to host 308 because the e-mail process 330 controls the host to set up the routing tables in this way. The e-mail process 330 controls host 308 to receive these IP packets containing e-mail either from the server at the headend via one of the broadband connections 14A, 14B, 14C, 14D (wireless local loop) or 14E (OC-1 or OC-3) or, in some alternative embodiments, via the conventional modem in PSTN interface 332. The host 308 extracts the e-mail data and encapsulates it in an IP packet addressed to an e-mail process in a settop decoder box of one or more of the TVs out on the LANs coupled to the NICs 310 through 318. These IP packets are then encapsulated into LAN packets of the type packet switch 302 can route and sent to the switch which routes them to the appropriate NIC. The NIC then strips off the LAN header if necessary and replaces it with whatever LAN header is used in the protocol implemented by the NIC. In the preferred embodiment, packet switch 302 is an Ethernet protocol switch because they are cheap and plentiful. However, if the packets need to be sent over a wireless LAN with its own proprietary protocol such as the Blue Tooth protocol, the Ethernet headers need to be stripped off and replaced with Blue Tooth LAN packet headers.

At the settop decoders, the e-mail data is stripped out of the packets and converted to an analog NTSC, PAL or SECAM video signal just like auxiliary data that comes with video programs gets converted in the same way. In some embodiments, the analog signal containing the e-mail can be superimposed on whatever video program is being watched such as in a scrolling banner above or below the picture or in "picture-in-picture" box that can be moved around the screen.

If the user wishes to reply or send an e-mail, a command is sent from the wireless remote or keyboard which gets routed to process 330 which then sends out data for a message composition screen. This screen gets displayed, and as characters are entered into the various fields via the wireless keyboard or remote control, they are displayed on the composition screen either by being echoed back from the e-mail process 330 or by a wireless remote transceiver process at the settop decoder. When the message is ready to send, the user gives a send command by invoking an icon or typing a text command. The data is the message is then encapsulated in an IP packet addressed to the mail server of the customer's ISP. This is done either by the e-mail process 330 or by a process in the settop decoder depending upon where the wireless remote transceiver is located and the message is composed and stored in memory. If that happens at the settop decoder, the IP packets are encapsulated into LAN packets addressed to process 330 and sent to the NIC where they get routed to process 330. Host 308 then does the appropriate header stripping and additional encapsulation if necessary to get the packets addressed to the appropriate transceiver in block 300 or conventional modem in interface 332 for transmission to the mail server.

In some alternative embodiments, a voicemail and/or PBX application 334 (hereafter referred to as the PBX application) will control host 308 to allow the gateway to double as a PBX with voicemail recording capability and implement voice-over-IP services for telephones coupled via LAN adapters to one or more LANs coupled to the gateway. In these embodiments, the PBX application controls the host 308 to monitor incoming calls from the PSTN via PSTN interface 332 and incoming calls from voice-over-IP channels and to provide traditional PBX functionality including provision of voicemail. Some of this traditional PBX functionality is to set up conference calls, to transfer calls to different extensions, to multiplex multiple incoming simultaneous calls on different voice-over-IP channels to the appropriate extension phones coupled to the gateway via a LAN, to multiplex simultaneously outgoing calls from different extensions onto multiple voice-over-IP channels on one or more of the broadband transmission mediums coupled to block 300, to park an incoming call on a busy extension, to put a caller on hold, and do any other traditional PBX only functions. PSTN interface circuits to interface personal computers to the PSTN to do the PSTN signalling protocol, generate call progress tones, dial numbers, digitize incoming analog voice signals for processing by the computer, convert digitized voice to analog signals, etc. are commercially available from Dialogic and other sources. Interface 332 and PBX application 334 represent the hardware and software of these prior art systems as modified to work in the gateway environment with LANs coupling the individual telephones to the gateway.

The modifications needed to the prior art hardware and software are as follows. Host 308 must build routing data in the routing tables such that call status packets coming from PSTN interface 332 are routed to host 308, and signalling packets generated in host 308 are routed to interface 332 and call progress tone packets such as ring signals, busy signals, etc. generated by host 308 are routed to the appropriate NIC for sending to the proper telephone adapter. For example, suppose an incoming ring signal is detected by interface 332. A signal packet indicating a ring will be routed to host 308. Host 308 generates an "answer packet" telling the interface 332 to go off-hook and generates and sends message packets to play a greeting message to interface 332. The interface goes off hook, converts the message data to analog voice signals and couples these analog signal on the PSTN lines. Typically, the greeting would say something like, "Thank for calling the Smith residence. If you would like to talk to Sonia, dial ext 10. If you would like to talk to . . . . If you would like to leave a voicemail message, dial ext 34." The incoming dial tones for the chosen extension are detected by interface 332, packetized and routed to host 308. Alternatively, the tones are digitized and sent to host 308 for recognition. The host 308 then responds under control of the PBX function to carry out the request. If the caller wants to speak to Sonia, the host generates a "ring control" IP packet addressed to Sonia's telephone adapter and encapsulates it in a LAN packet addressed to Sonia's telephone adapter or the NIC to which it is coupled by a LAN. Router 302 routes the packet to the appropriate NIC, and it is transmitted on the LAN or repacketized and transmitted on the LAN to Sonia's telephone adapter which converts it to a ring signal and rings Sonia's phone. A timer or ring counter is started by the host for purposes of diverting the caller to voicemail if Sonia does not answer.

Sonia's telephone adapter detects when Sonia answers her phone, and sends back a packet indicating the phone was answered. If Sonia does answer her phone, and speaks, the telephone adapter digitizes her voice, packetizes the data in IP packets addressed to host 308 and packetizes the IP packets in LAN packets and sends them on the LAN. The NIC receives the packets and repacketizes them if necessary into LAN packets the router 302 uses addressed to host 308 and sends them to the router for routing to the host. In alternative embodiments, these packets may be repacketized by the NIC under control of the host 308 into LAN packets addressed to interface 332 and routed directly to the interface. If they go to the host, the host repacketizes them addressed to interface 332 and sends them to the router for transfer to the PSTN interface 332. The interface does D/A conversion to convert the data of Sonia's voice to analog audio and plays the audio out on the PSTN pair. When the call is finished and one or the other conversant hangs up, this fact is detected by interface 332 or Sonia's telephone adapter and a control packet is sent to host 308 which sends a control packet to interface 332 causing it to go on-hook and sends any necessary call progress tone packet to Sonia's telephone adapter to, for example, cause it to play a dial tone if the caller was first to hang up.

If Sonia's phone was not answered, and timeout occurs without receiving a "phone was answered" packet, the host 308 generates and sends to interface 332, packets that play Sonia's prerecorded voicemail greeting. The interface 332 converts them to analog audio and plays them on the PSTN pair. The greeting includes a beep tone to signal when to start leaving a message. When the caller speaks her message, the sound is digitized and packetized and addressed to the voicemail process in the PBX process 334. The voicemail process creates a file in a directory structure on hard disk 338 or the TIVO server hard drive 322 and stores the voicemail data in the file. The host 308 then sends a control packet to Sonia's telephone adapter to cause it to light a message waiting light or other give a message waiting indication.

Outgoing calls work as follows. When Sonia picks up her phone, her adapter sends a control packet to the host over the LAN saying she has gone off-hook. Host sends back call progress tone packets over the LAN to cause the adapter to play a dial tone. Sonia dials a number. The adapter either recognizes the DTMF tones or digitizes them and sends them to the host for recognition. Either way, the host receives data from which it can figure out the number called. The host reacts by sending control packets to interface 332 telling it to go off hook and dial a certain number. The interface goes off hook, and then a DTMF generator in the interface 332 generates the DTMF tones of the number dialed. Call progress tones such as ringing tones from the central office are recognized and control packets are sent to host 308 or simply digitized and sent to host 308 for recognition. Host 308 sends the same call progress tones in LAN packets to Sonia's telephone adapter over the LAN. When the called party picks up and speaks, the voice is digitized, packetized and routed to host 308 which repacketizes it into IP packets and LAN packets addressed to Sonia's telephone adapter and sends them to the router. The router routs them to the proper NIC and they then may get repacketized into the LAN packets for the particular LAN protocol in use and then they are sent on the LAN. The reverse process happens for packets containing Sonia's digitized voice replies.

This functionality just described for PBX application 334 is referred to in the claims as voicemail and PBX functionality. In some embodiments, the phones may be coupled to the gateway by dedicated lines in which case, host 308 controls an interface like 332 for each tip and ring pair coupled to a phone in the household, and the software is modified to not send and receive digitized voice and control and call progress packets to telephone adapters over a LAN but sends them directly to the appropriate interface coupled to the tip and ring pair coupled to the appropriate phone.

In some alternative embodiments, a web server application 340 controls host computer 308 to serve web pages to browsers on the internet. This is done via a suitable interface 332 to a T1, partial T1 or ADSL channel to a router or switch coupled to the internet at a PSTN central office or via a dedicated T1 line through the central office to an Internet Service Provider (ISP) to provide an always on channel to a router/switch on the internet at the ISP. In alternative embodiments, the always on connection to the internet is provided via a cable modem in block 300 and an HFC channel to a router or switch coupled to the internet at the cable plant headend. In still other embodiments, connectivity to the internet may be made through a Starband transceiver in block 300 and a satellite uplink and a satellite downlink to router or switch coupled to the internet at the Starband server farm. Wireless local loop connections to the internet may also be used in some embodiments.

Web browsers can visit the URL of web server 340 and request one or more web pages. These web pages are packetized in IP packets addressed to the web browser that requested them by host 308 and are then packetized in LAN packets of the type switch 302 understands addressed to T1 interface 332, all under control of web server 340. The LAN packets are then sent to router 302 which sends them to T1 interface 332 which strips off the LAN packet headers and transmits them to the router on the internet on T1 timeslots. The router on the internet gets them to the browser that requested them. Further requests from the browser are sent back to T1 interface 332 as IP packets that get routed by router 302 to host 308 and web server process 340.

The web server application is an HTTP server program such as HTTPD running on a Unix operating system, Microsoft's Internet Information Server or Netscape's Enterprise Server running under a Windows operating system.

In some embodiments, the host 308 is further programmed by an answering machine program 342 to provide a shared answering machine to record messages for all members of the household for incoming conventional PSTN telephone calls arriving via PSTN interface 332 or via voice-over-IP packets arriving from the headend via cable modem, satellite transceiver, etc. in block 300. The answering machine program controls host 308 in a manner identical to that previously described for the voicemail functionality of the PBX program 334, but it does not provide the PBX functionality of PBX program 334 to set up conference calls, transfer calls to different extensions, multiplex multiple simultaneous calls onto different voice-over-IP channels on one of the broadband transmission mediums coupled to block 300, park an incoming call on a busy extension, put a caller on hold, and other traditional PBX only functions.

Referring to FIG. 9, there is shown a block diagram of a wireless remote control implemented on a personal digital assistant (PDA) having wireless capabilities. The remote control of FIG. 9 can do all regular PDA functions it is programmed to do such as calendar and appointments, word processing, database and address book functions. However, in addition, it has a wireless RF transceiver module 380 that plugs into the PDA's PCMCIA or Handspring Visor Springboard slot by which commands and data can be exchanged with the transceiver of a home gateway or some settop decoder with a transceiver on a LAN coupled to the gateway. In alternative embodiments, module 380 is a wireless LAN NIC that couples the remote to the gateway through a wireless LAN or hardwired LAN having a peripheral coupled thereto which communicates with the NIC 380. The PDA is programmed with various programs which implement various ones of the following functions: menu display, transmission of upstream requests, receiving and decompressing an MPEG compressed video stream and converting the data to a format suitable for display on the PDA display, TCP/IP processing of IP packets, web browsing, smart appliance control, TIVO function control for digital video recording and video special effect control of TIVO functions implemented by the home gateway or headend, IP telephony, MP3 player and cellular telephony.

The PDA remote 399 is comprised of a host processor coupled by conventional circuitry to an LCD or TFT or any other conventional computer display 402 and to a keyboard, pointing device or other user input device on the PDA. The host 400 is also coupled to audio input and output circuits 406 to allow playing of MP3 files and receiving audio inputs such as voice commands to control TIVO functions, change channels, order movies, play games etc. Voice recognition software of a conventional variety may be used if voice commands are to be given. PCMCIA or springboard modular wireless transceiver or wireless LAN NIC (hereafter just PC card) 380 provides the connectivity to the gateway either directly or through a wireless or other LAN coupled to the gateway to send and receive commands and data.

Memory 408 may be volatile or nonvolatile EEPROM and usually has some of each. The memory has a reserved frame buffer 410 and working address space 412 which includes both memory and I/O space for the PC card. In some embodiments, the PC card includes auxiliary expansion memory which may be accessed simultaneously with the other circuitry on the PC card as is known in the art. An operating system 415 is shown as stored in working memory. Memory 408 also includes one or more programs that drive menu displays on display 402, but these are usually part of OS 415 or any of the other application programs.

One or more programs 416 control host 400 and display 402 to display menus from which services provided by the headend may be ordered or invoked by receiving input from keyboard/input device 404. This causes host 400 to generate an IP packet using TCP/IP stack programs 418 requesting the service and sends it PC card 380 for transmission to the gateway. These upstream request packets can include such requests as ordering a video on demand selection, changing a channel for broadcasts, ordering a preview of another channel or VOD selection to be sent to the PDA remote 399 for viewing on display 402 while something else is watched on a TV connected directly or indirectly to the gateway, etc. One or more MPEG decompression programs 420 control host 400 to receive MPEG compressed streaming video of previews, game video, etc. to be displayed on remote display 402 and decompressed the video back to its uncompressed state. Program(s) 420 then control host 400 to convert the video to a state in which it can be viewed on display 402 and stores each frame of data in frame buffer 410.

One or more programs implementing a web browser control host 400 to send upstream IP request packets via PC card 380 to the gateway. The gateway routes the packets to the web server in the gateway, if implemented, or to a web server connected to the internet through a conventional modem or a broadband internet channel on the broadband medium(s) 14. These packets allow the user to use the PDA remote to browse the internet in wireless fashion and to receive IP packets containing web page data and e-mail and attachments. The program(s) 422 control host 400 to strip out the data and convert it to a format for display on display 402.

One or more programs 424 allows the user to use the PDA remote to, in a wireless fashion, control various smart appliances coupled to the gateway through the LAN. Thus, the user can turn on a coffee machine or microwave, lower or raise her thermostat, turn an oven on or off, etc. while watching TV in another room.

One or more programs 426 control the host 400 to receive TIVO menu packets and display the menus, and receive user input from the keyboard or pointing device to make selections of TIVO functions to be implemented by the gateway or headend etc.

One or more programs 428 control host 400 to implement IP telephony to allow the user to make free long distance calls in a wireless fashion. Program(s) 428 control host 400 to received digitized voice data from audio I/O circuits 406 and to receive dialing instructions from the keyboard/input device 404 (a telephone keypad may be displayed on display 402 and numbers picked by pointing device). IP packets are then sent back and forth to the gateway for dialing, call progress sounds and incoming and outgoing digitized voice. The gateway routes these packets via a broadband medium to a server on the internet which routes them to a server at the other end which interfaces the internet to a conventional phone via the local loop or to another IP telephony process for conversion to sounds the other conversant can hear and do all the other things necessary to complete the call. The IP telephony programs substitute the packet switching of the internet for the traditional switched circuit dedicated connections of the PSTN.

One or more programs 430 control host 400 to order MP3 music files from an MP3 server in the gateway, decode the files into digital data that can be played by the audio I/O circuits 406 and send the decoded data to the audio I/O circuits 406.

One or more programs 432 control host 400 to use audio I/O circuits 406 to convert the PDA remote into a cellular telephone. This works the same way as the IP telephony, except the digitized voice, status and control traffic, call progress tone data, dialing instructions, etc. are encapsulated in IP packets and then encapsulated in LAN packets the router in the gateway understands. These packets are then transmitted directly to the gateway or to a wireless LAN NIC for transfer to the gateway with appropriate LAN packet encapsulation/translation for the intervening protocols between the PDA and the router in the gateway. The router in the gateway then routes them to a cellular transceiver in the gateway for coupling to the cellular network. In alternative embodiments, the IP packets containing cellular data may be sent over a broadband medium to the headend where it is routed to a cellular transceiver coupled to the cellular network. This is especially effective where cellular coverage does not reach a customer's home but does reach the headend.

One or more programs 434 control the host to do conventional PDA functions such as calendar, address book, word processing and database functions. Another program which may be present as symbolized by block 434 controls said host 400 to carry out a discovery process to determine what servers are present in the gateway and/or headend and what their IP addresses are.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A system comprising:
   one or more transmission mediums for carrying at least upstream and downstream digital data traffic;
   a headend circuit coupled to all said transmission mediums and containing or coupled to one or more server computers and/or other circuits to provide at least digital data services to a plurality of customers;
   one or more local area networks and/or dedicated LAN segments or data paths at each customer premises;
   one or more peripheral devices at each customer premises coupled to said one or more local area networks and/or dedicated LAN segments or dedicated data paths, said one or more peripheral devices including a non-television component;
   a plurality of gateway means at customer premises locations and coupled to all said transmission mediums and coupled to said one or more local area networks, for receiving, demodulating and detecting digital data transmitted to one or more of said peripherals from said headend circuit and to packetize and route said data to the appropriate peripheral device via said one or more local area networks or one or more ports directly connected by dedicated lines or LAN segments to one or more peripherals, and for managing traffic and bandwidth and rate shaping if necessary to match the data rate of data to be transmitted over a data path to the available bandwidth on that data path; and
   a remote control means at one or more customer premises and, at each premises, coupled by wireless digital data communication circuitry to said gateway or to said gateway through a peripheral device, for issuing commands to said headend circuit through said gateway and one or more transmission mediums to provide data to said one or more peripherals through said one or more transmission mediums and said gateway.

2. The apparatus of claim 1 wherein said wireless digital data communication circuitry is a digital data transceiver and wherein said remote control means includes a display and audio data playing circuitry and further includes means for decompressing compressed video and/or audio data received by said transceiver and displaying the decompressed video image data and for playing decompressed audio data, and further comprising means for receiving and displaying internet protocol packet data defining web pages, graphics, e-mail and other data that is received from the internet.

3. A system comprising:
   a satellite dish for receiving downstream digital video data traffic at each customer premises location;
   a conventional telephone line at each customer premises location and routed to a central office headend, for carrying low speed internet protocol digital data traffic both upstream and downstream;
   a digital video headend circuit coupled to one or more video and/or other servers to transmit digital video and other data implementing one or more services to one or more satellites for retransmission to the satellite dishes at each customer premises location;
   a central office headend server coupled to each of said telephone lines for implementing the bidirectional transmission of internet protocol data packets to and from said customer premises and servers on the internet;
   one or more local area networks at each customer premises;
   one or more peripheral devices including at least one non-television component at each customer premises coupled to said one or more local area networks;
   a plurality of gateways, at least one at each customer premises locations, each gateway coupled to a satellite dish and to a conventional telephone line and coupled to said one or more local area networks and functioning to extract digital video and other data transmitted to one or more of said peripherals from said digital video headend and/or said central office headend server and to route said data to the appropriate peripheral device via said one or more local area networks; and
   a remote control means at each customer premises coupled by wireless digital data communication circuitry to said gateway or to said gateway through a peripheral device, for issuing commands to said digital video headend circuit and to said central office headend server through said gateway and one or more conventional telephone lines to provide data to said one or more peripherals through said satellite dish and/or a conventional telephone line and said gateway and local area network.

4. A system comprising:
a satellite dish for receiving downstream digital video data traffic at each customer premises location;
a cable television hybrid fiber coaxial cable network (hereafter HFC network) for carrying analog television broadcast signals and high speed internet protocol digital data traffic both upstream and downstream;
a digital video headend circuit coupled to one or more video and/or other servers to transmit digital video and other data implementing one or more services to one or more satellites for retransmission to the satellite dishes at each customer premises location;
a cable television headend circuit coupled to each of servers for implementing the bidirectional transmission of data packets to and from said customer premises and servers on the internet and for implementing bidirectional transmission of data packets from said servers to said customer premises implementing other services;
one or more local area networks at each customer premises;
one or more peripheral devices including at least one non-television component at each customer premises coupled to said one or more local area networks;
a plurality of gateways, at least one at each customer premises locations, each gateway coupled to a satellite dish and having a cable modem included therein to couple said gateway to said HFC network and coupled to said one or more local area networks and functioning to extract digital video and other data transmitted to one or more of said peripherals from said digital video headend circuit and/or said cable television headend circuit and to route said data in the appropriate format to the appropriate peripheral device via said one or more local area networks; and
a remote control means at each customer premises coupled by wireless digital data communication circuitry to said gateway or to said gateway through a peripheral device, for issuing commands to said cable television headend circuit through said gateway and said HFC network to provide data to said one or more peripherals through said HFC network and said gateway and local area network.

5. The system of FIG. 4 wherein said gateway has a conventional modem therein which interfaces said gateway to said digital video headend circuit through said remote control means and a telephone line circuit of the public service telephone network for purposes of ordering pay-per-view events for viewing on one or more of said peripherals.

6. A system comprising:
a plurality of satellite dishes for receiving downstream digital video data traffic, each satellite dish at a customer premises;
a digital video headend circuit coupled to one or more video servers for transmitting digital video broadcast data to said plurality of satellite dishes via an uplink, a satellite and a downlink;
a plurality of conventional telephone lines, each routed to a customer premises and each for carrying low speed internet protocol digital data traffic both upstream and downstream;
a plurality of gateway means, each at a customer premises and coupled to at least one of said telephone lines and at least one of said satellite dishes;
a central office server coupled to the internet and to said conventional telephone lines to provide bidirectional internet protocol data transfers between each said gateway and servers on the internet via a conventional telephone line;
one or more conventional analog televisions at each customer premises coupled to said gateway via audio and video lines;
one or more non-television components at each customer premises coupled to said gateway by way of a local area network;
a remote control at each customer premises, and coupled by wireless digital data communication circuitry to said gateway or to said gateway through a peripheral device, for at least sending data and commands to said central office internet server through said gateway and a conventional telephone line to cause bidirectional data transfers between said gateway and said internet server;
each said gateway means for receiving compressed digital video broadcast data and for wireless receiving commands from said remote control, and for coordinating use of said remote control and said conventional analog television like a computer keyboard and display, respectively, for sending and receiving internet protocol data over a conventional telephone line so as to enable use of said television and remote control and gateway like a personal computer to display web pages and/or e-mail, and for routing said compressed digital video data to a hard disk for recording or to a decompression and conversion circuit for processing for display on said television(s) or both.

7. The apparatus of claim 6 wherein said remote control includes a display and a transceiver to receive compressed digital video broadcast data and decompression and conversion circuitry to buffer frames of said data and decompress said compressed digital video data and convert it to YUV or other format uncompressed video data that can be displayed on said display.

* * * * *